US009653094B2

(12) United States Patent
Stone et al.

(10) Patent No.: US 9,653,094 B2
(45) Date of Patent: May 16, 2017

(54) METHODS AND SYSTEMS FOR PERFORMING SIGNAL ANALYSIS TO IDENTIFY CONTENT TYPES

(71) Applicant: Cyber Resonance Corporation, San Francisco, CA (US)

(72) Inventors: Troy Christopher Stone, Orlando, FL (US); Wayne Roy Lappi, San Francisco, CA (US)

(73) Assignee: CYBER RESONANCE CORPORATION, San Francisco, CA (US)

( * ) Notice: Subject to any disclaimer, the term of this patent is extended or adjusted under 35 U.S.C. 154(b) by 0 days.

(21) Appl. No.: 15/135,369

(22) Filed: Apr. 21, 2016

(65) Prior Publication Data

US 2016/0314803 A1    Oct. 27, 2016

Related U.S. Application Data

(60) Provisional application No. 62/152,198, filed on Apr. 24, 2015, provisional application No. 62/174,293, filed on Jun. 11, 2015.

(51) Int. Cl.
*H04R 29/00* (2006.01)
*G10L 25/48* (2013.01)
(Continued)

(52) U.S. Cl.
CPC ............. *G10L 25/48* (2013.01); *G06F 3/165* (2013.01); *G10L 25/03* (2013.01); *H04H 60/58* (2013.01);
(Continued)

(58) Field of Classification Search
CPC .................................................... H04R 29/00
See application file for complete search history.

(56) References Cited

U.S. PATENT DOCUMENTS 3,879,724 A    4/1975  McDonald
5,210,820 A    5/1993  Kenyon
(Continued)

FOREIGN PATENT DOCUMENTS

CN    1835073    9/2006
EP    1006685    6/2000
(Continued)

OTHER PUBLICATIONS

Biernacki, "Intelligent System for Commercial Block Recognition Using Audio Signal Only," Knowledge-Based and Intelligent Information and Engineering Systems, LNCS 6276 (Proceedings of the 14th International Conference on KES 2010, Part I), pp. 360-368, Sep. 8-10, 2010.

(Continued)

*Primary Examiner* — Olisa Anwah
(74) *Attorney, Agent, or Firm* — Knobbe, Martens, Olson & Bear LLP

(57) ABSTRACT

Systems and methods are configured to process audio signals to identify content-types. Audio content is received at an audio decoder which decodes the audio content. The decoded audio content is segmented into frames by applying a windowing function to a given audio frame using a window having a time width related to a delay time of the decoder. A power spectrum estimate of a given frame is determined. A mel filter bank is applied to the power spectrum of the frame. A DCT matrix is applied to filter bank energies to generate a DCT output. A log of the DCT output is used to generate a mel coefficient 1. A threshold for the content is dynamically determined. The mel coefficient 1 and the dynamically determined threshold are used to detect a near silence between content-types and to identify the content-types.

29 Claims, 18 Drawing Sheets

(51) Int. Cl.
   *G06F 3/16* (2006.01)
   *H04H 60/58* (2008.01)
   *G10L 25/03* (2013.01)
   G10L 19/022 (2013.01)
   G10L 25/87 (2013.01)
   G10L 25/24 (2013.01)

(52) U.S. Cl.
   CPC ............ *G10L 19/022* (2013.01); *G10L 25/24* (2013.01); *G10L 25/87* (2013.01)

(56) References Cited

U.S. PATENT DOCUMENTS

| | | |
|---|---|---|
| 5,343,251 A | 8/1994 | Nafeh |
| 5,436,653 A | 7/1995 | Ellis et al. |
| 5,737,716 A | 4/1998 | Bergstrom et al. |
| 5,903,482 A | 5/1999 | Iwamura et al. |
| 5,918,223 A | 6/1999 | Blum et al. |
| 6,292,776 B1 | 9/2001 | Chengalvarayan |
| 6,529,809 B1 | 3/2003 | Breed et al. |
| 6,597,405 B1 | 7/2003 | Iggulden |
| 7,299,050 B2 | 11/2007 | Delaney et al. |
| 8,249,872 B2 | 8/2012 | Aronowitz et al. |
| 8,369,532 B2 | 2/2013 | Aarts |
| 8,396,705 B2 | 3/2013 | Bilobrov |
| 8,825,188 B2 | 9/2014 | Stone et al. |
| 8,918,316 B2 | 12/2014 | Ben et al. |
| 8,925,024 B2 | 12/2014 | Wright et al. |
| 2002/0133499 A1 | 9/2002 | Ward et al. |
| 2002/0176702 A1 | 11/2002 | Frantz |
| 2006/0196337 A1 | 9/2006 | Breebart et al. |
| 2006/0229878 A1 | 10/2006 | Scheirer |
| 2007/0288952 A1 | 12/2007 | Weinblatt |
| 2008/0103761 A1* | 5/2008 | Printz ................... G06Q 30/02 704/9 |
| 2008/0127244 A1 | 5/2008 | Zhang |
| 2009/0220109 A1* | 9/2009 | Crockett .............. H03G 3/3089 381/107 |
| 2009/0299750 A1* | 12/2009 | Yonekubo ............... G10L 25/78 704/270 |
| 2010/0195972 A1 | 8/2010 | Casagrande |
| 2010/0274554 A1* | 10/2010 | Orr ......................... G10L 25/78 704/201 |
| 2013/0259211 A1 | 10/2013 | Vlack et al. |
| 2016/0088160 A1* | 3/2016 | Tan ......................... G10L 25/78 455/416 |

FOREIGN PATENT DOCUMENTS

| | | |
|---|---|---|
| EP | 1341310 | 9/2003 |
| EP | 2353237 | 8/2011 |
| EP | 1730105 | 1/2012 |
| WO | WO 2013/184520 | 12/2013 |
| WO | WO 2014 082812 A1 | 6/2014 |

OTHER PUBLICATIONS

Kopparapu et al., "Choice of Mel Filter Bank in Computing MFCC of a Resampled Speech," In: The 10th International Conference on Information Sciences Signal Processing and their Applications (ISSPA 2010), pp. 121-124, May 10-13, 2010.
PCT International Search Report and Written Opinion dated Jul. 28, 2016, Application No. PCT/US2016/028682, 7 pages.
U.S. Appl. No. 14/313,911, filed Jun. 24, 2014, Stone et al.
Andersson, Tobias, *Audio classification and content description*, Audio Processing & Transport Multimedia Technologies Ericsson Research, Lulea, Sweden, Mar. 2004; ISSN: 1402-1617.
Doets et al., "Distortion Estimation in Compressed Music Using Only Audio Fingerprints", Feb. 2008, IEEE Transactions on Audio, Speech, and Language Processing, vol. 16, No. 2, pp. 302-317.
Giannakopoulos, T. et al., *Introduction to Audio Analysis, A Matlab Approach*, First Edition, 2014.
Haitsma et al., "A Highly Robust Audio Fingerprinting System", 2002, IRCAM, pp. 1-9.
International Search Report and Written Opinion, PCT/US2013/043737, mailed Sep. 16, 2013, 11 pages.

* cited by examiner

Content Identification System

MFCC Short-term Features

Mid-term Statistics

Calculation of Dynamic Threshold

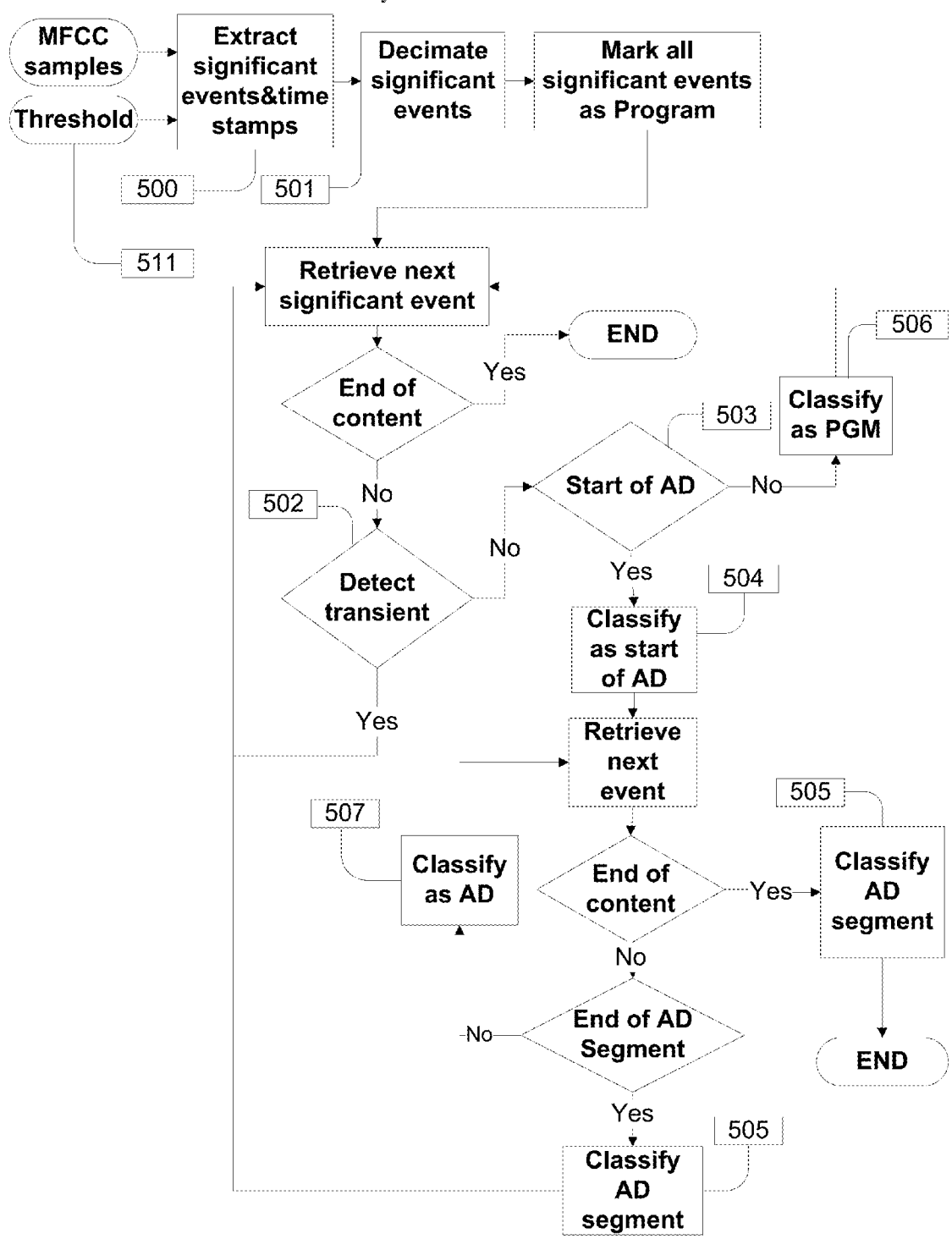

Dynamic Threshold applied to MFCC

Histogram of Dynamic Threshold over 122 shows

Mid-term Statistic and Dynamic Threshold

Short-term Features – Coefficient #1
Accurate Significant Event Timing

Short-term Features – Coefficient #1
Transient Detection

Short-term Features – Coefficient #1
Alternate Threshold and Detection

Short Term Feature (MFCC)
Window and Step Alignment to Frame Illustration

MFCC Coefficient#1 utilizing
11ms Windows (1/3 Frame Size)

Classified Content Automation System

Example Implementation
Consumer Device

Transport Control Automation

Example Chapter Menu Implementation

Content Based Volume Automation

Example Implementation
Content Distributer

METHODS AND SYSTEMS FOR PERFORMING SIGNAL ANALYSIS TO IDENTIFY CONTENT TYPES

INCORPORATION BY REFERENCE TO ANY PRIORITY APPLICATIONS

Any and all applications for which a foreign or domestic priority claim is identified in the Application Data Sheet as filed with the present application, are hereby incorporated by reference under 37 CFR 1.57.

BACKGROUND OF THE INVENTION

Field of the Invention

The present invention is related to signal processing, and in particular to methods and systems for identifying content type in signals, such as audio signals.

Description of the Related Art

Conventional approaches to identifying content type in a signal, such as in a television or radio audio signal, have proven deficient. For example, certain conventional techniques for identifying commercials based on signal information are unreliable, cannot be performed quickly, or require large databases of reference signatures. Certain conventional techniques require that metadata or the like be included in the signal to identify the content type.

SUMMARY OF THE INVENTION

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In a first aspect of the present disclosure there is provided a method of detecting advertisements and advertisement segments from an audio stream, or a video stream based on its associated audio stream, which optionally enables timestamps to be transmitted to consumer electronic devices or application software (e.g., a digital video recorder (DVR), smart phone, TV, tablet, laptop, desktop computer, game console, wearable device, and/or other devices) to provide automation (e.g., time-shifting, volume attenuation, play, fast-forward, previous channel, chapter menus, etc.).

An aspect of this disclosure relates to a method of processing audio signals to identify content, the method comprising: receiving digitized audio content; decoding the audio content using a decoder; segmenting frames of the decoded audio content by applying a windowing function to a given audio frame using a first window type having a time width approximately equal to a delay time of the decoder; calculating an estimate of a power spectrum of a given frame; applying a mel filter bank to the power spectrum of the given frame and providing resulting filter bank energies; applying a DCT matrix to the resulting filter bank energies to generate a DCT output; taking a log of the DCT output to generate a mel coefficient 1; dynamically calculating a first threshold for the content; and utilizing the mel coefficient 1 and the dynamically calculated first threshold to detect a near silence between content of different types and to identify the types of content separated by the near silence.

An aspect of this disclosure relates to a method of processing audio signals to identify content, the method comprising: receiving digitized audio content; decoding the audio content using a decoder; segmenting frames of the decoded audio content by applying a windowing function to a given audio frame using a first window type having a time width approximately equal to a delay time of the decoder; calculating an estimate of a power spectrum of a given frame; applying a mel filter bank to the power spectrum of the given frame and providing resulting filter bank energies; applying a DCT matrix to the resulting filter bank energies to generate a DCT output; taking a log of the DCT output to generate a mel coefficient (e.g., mel coefficient 1); dynamically calculating a first threshold for the content; and utilizing the mel coefficient (e.g., mel coefficient 1) and the dynamically calculated first threshold to detect a near silence between content of different types and to identify the types of content separated by the near silence.

An aspect of this disclosure relates to a method of processing audio signals to identify content, the method comprising: receiving digitized audio content; decoding the audio content using a decoder; segmenting frames of the decoded audio content by applying a windowing function to a given audio frame using a first window type (optionally having a time width approximately equal to a delay time of the decoder); calculating an estimate of a power spectrum of a given frame; applying a mel filter bank to the power spectrum of the given frame and providing resulting filter bank energies; applying a DCT matrix to the resulting filter bank energies to generate a DCT output; taking a log of the DCT output to generate a mel coefficient 1 (e.g., mel coefficient 1); dynamically calculating a first threshold for the content; and utilizing the mel coefficient (e.g., mel coefficient 1) and the dynamically calculated first threshold to detect a near silence between content of different types and to identify the types of content separated by the near silence.

An aspect of the disclosure relates to a content identification system, comprising: an input circuit configured to receive bitstream audio channel content; an audio decoder circuit coupled to the input circuit and configured to decode the bitstream audio channel content; an analysis engine configured to: segment frames of the decoded audio content by applying a windowing function to a given audio frame using a first window type having a time width approximately equal to a delay time of the decoder; calculate an estimate of a power spectrum of a given frame; apply a mel filter bank to the power spectrum of the given frame and providing resulting filter bank energies; apply a DCT matrix to the resulting filter bank energies to generate a DCT output; take a log of the DCT output to generate a mel coefficient 1; dynamically calculate a first threshold for the content; and utilize the mel coefficient 1 and the dynamically calculated first threshold to detect a near silence between content of different types and to identify the types of content separated by the near silence.

An aspect of the disclosure relates to a non-transitory computer-readable storage medium storing computer executable instructions that when executed by a processor perform operations comprising: receiving digitized audio content; decoding the audio content using a decoder; segmenting frames of the decoded audio content by applying a windowing function to a given audio frame using a first window type having a time width approximately equal to a delay time of the decoder; calculating an estimate of a power spectrum of a given frame; applying a mel filter bank to the power spectrum of the given frame and providing resulting filter bank energies; applying a DCT matrix to the resulting filter bank energies to generate a DCT output; taking a log of the DCT output to generate a mel coefficient 1; dynamically calculating a first threshold for the content; and utilizing the mel coefficient 1 and the dynamically calculated first threshold to detect a near silence between content of different types and to identify the types of content separated by the near silence.

An aspect of the disclosure relates to a non-transitory computer-readable storage medium storing computer executable instructions that when executed by a processor perform operations comprising: receiving digitized audio content; decoding the audio content using a decoder; segmenting frames of the decoded audio content by applying a windowing function to a given audio frame using a first window type having a first window time width; calculating an estimate of a power spectrum of a given frame; applying a mel filter bank to the power spectrum of the given frame and providing resulting filter bank energies; applying a DCT matrix to the resulting filter bank energies to generate a DCT output; taking a log of the DCT output to generate a mel coefficient 1; dynamically calculating a first threshold for the content; and utilizing the mel coefficient 1 and the dynamically calculated first threshold to detect a near silence between content of different types and to identify the types of content separated by the near silence.

BRIEF DESCRIPTION OF THE DRAWINGS

Embodiments will now be described with reference to the drawings summarized below. These drawings and the associated description are provided to illustrate example embodiments, and not to limit the scope of the invention.

FIG. 5 is an example block diagram illustrating the preferred method of extracting significant events and performing content identification.

DETAILED DESCRIPTION OF EMBODIMENTS

The following description is presented to enable any person skilled in the art to make and use the apparatus, and is provided in the context of particular applications of the apparatus and their requirements. Various modifications to the disclosed embodiments will be readily apparent to those skilled in the art and the general principles defined herein may be applied to other embodiments and applications without departing from the scope of the present apparatus. Thus, the present apparatus is not intended to be limited to the embodiments shown, but is to be accorded the widest scope consistent with the principles and features disclosed herein.

Conventional automatic detection systems may use video or audio or audio plus video to perform the content detection. Conventional video methods used in attempts to detect commercials in a video stream utilize a combination of rules identifying the dynamics of commercials inserted by broadcasting companies. Image features are used, for example searching for black frames or shot-cut rate average.

Conventional audio methods have utilized a combination of rules of advertising duration times for database comparison, changes in energy, silence detection, fingerprinting, clustering, short term processing and audio feature extraction.

Other conventional techniques utilize database comparison of Mel coefficients audio signatures. This technique may not be adequate when new advertisements have not yet been uploaded to the database. Additionally, Mel coefficients are not as effective when content distributors commonly up-mix 2 channel (L/R) encoded advertisements to 5.1 surround sound for customers, and therefore the original audio signature would not match the one audio signature previously stored in the database.

Other conventional advertising detection technique utilize a static threshold to discern the near silence present in non-advertising content from the near silence audio during advertisement segment transitions and advertisement transitions. Although static thresholds may sometimes be useful, the random nature or "noisiness" of the signal data may become increased and negatively impacted by differences in content distributors, network broadcasting, and television program genres, (e.g., dramas, sitcoms, reality, sports, animation, news, etc.).

Thus, conventional advertising detection techniques lack precision and may lead to erroneous results, requiring additional techniques and increased system implementation costs. Therefore, there is a need to enhance the process of detection of advertisements in order to achieve improved accuracy.

Figure 13:
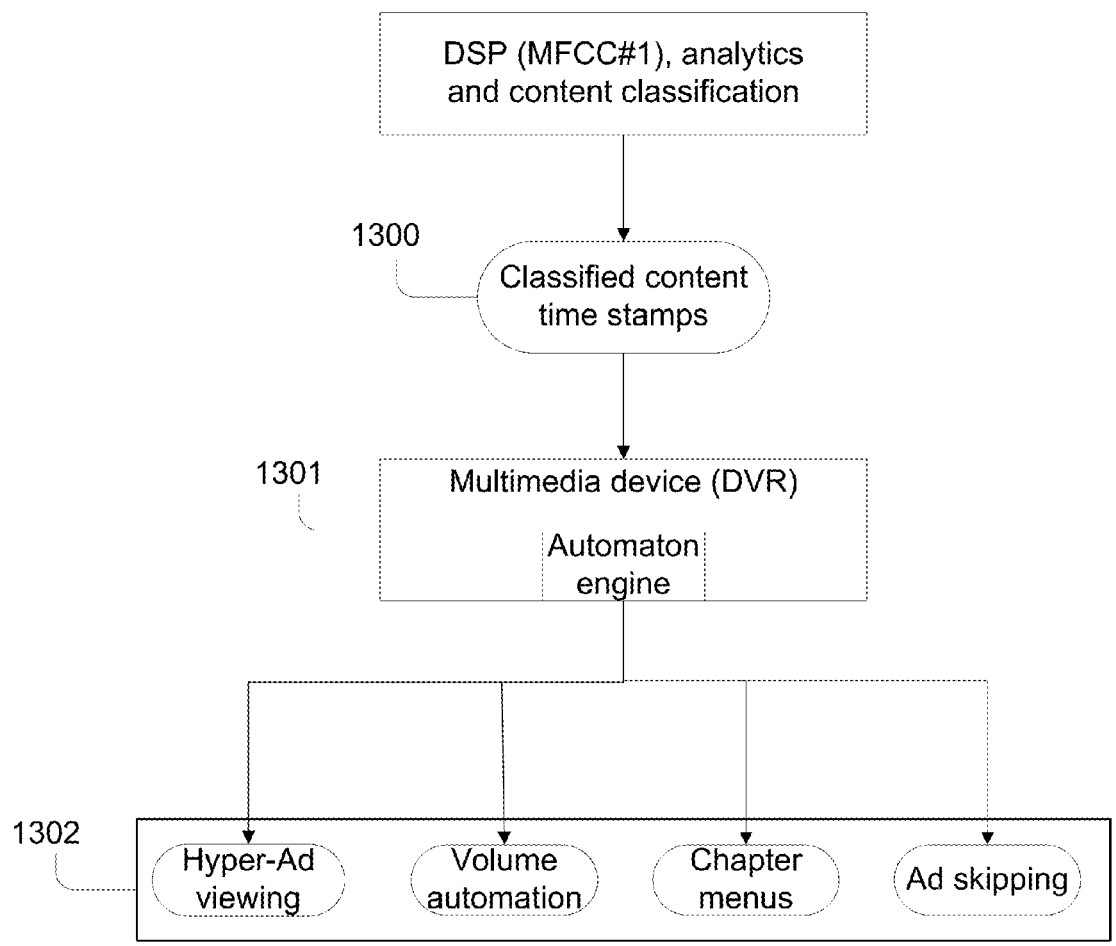
FIG. 13 is a block diagram of a Content Identification, Automation and Metric analytics systems.

FIG. 13 illustrates an example system and processes optionally used to detect advertisements and advertisement segments associated with multimedia content (e.g., in television or radio transmission feeds). The example system and processes may overcome some or all of the deficits of conventional approaches. FIG. 13 illustrates optional methods to identify timestamps of detected content and content classification 1300 may enable consumer electronic devices 1301 to provide automation 1302 historically managed by viewers via a remote control. For example, the digital content may be recorded onto DVR non-volatile memory (e.g., a hard drive, semiconductor memory, etc.). The recorded content may then be managed via a remote control by the DVR user. The remote control typically includes "forward," and "play" controls. The user can fast forward the recorded advertising content approximately to the point where the on-screen content appears to be the program content. The industry term that captures these concepts of viewing only what is desired is called time-shifting. The advertisements and advertisement segments may be identified, classified and timestamped 1300. The device 1301 may access the classified content timestamps 1300. By way of example, when a viewer decides to time shift and fast forward a program, the DVR 1301 will automatically resume playback 1302 at the precise timestamped program location. Thus, disclosed herein are methods of detecting advertisements and advertisement segments from an audio stream, or a video stream based on its associated audio stream, which optionally enables timestamps 1300 to be transmitted to consumer electronic devices or application software 1301 (e.g., a digital video recorder (DVR), smart phone, TV, tablet, laptop, desktop computer, game console, wearable device, and/or other devices enabling or providing content playback via content playback device or application (e.g., a video player)) to provide automation 1302 historically managed by viewers via a remote control (e.g., time-shifting, volume attenuation, play, fast-forward, previous channel, chapter menus, etc.). Moreover, because DVRs often automatically record any given show that is showing live on a given selected channel, automated channel swapping during advertising breaks is also optionally enabled.

The electronic device automation is discussed in greater detail elsewhere herein.

Although the example methods described herein may, by way of example, may be described in connection with detecting advertisement transitions in digital television transmission feeds, the methods may optionally be used to detect advertisements in analog television transmission feeds and/or in other types of audio/video media including internet-based media transmissions (e.g., in streaming content), video on demand media transmissions, remotely stored media for time-shifted media transmission and media transmissions stored locally for time-shifted viewing, etc., by way of example. Optionally, a digital, time domain, version of the audio signal may be obtained and stored in memory while other storage devices may be used.

Figure 1:
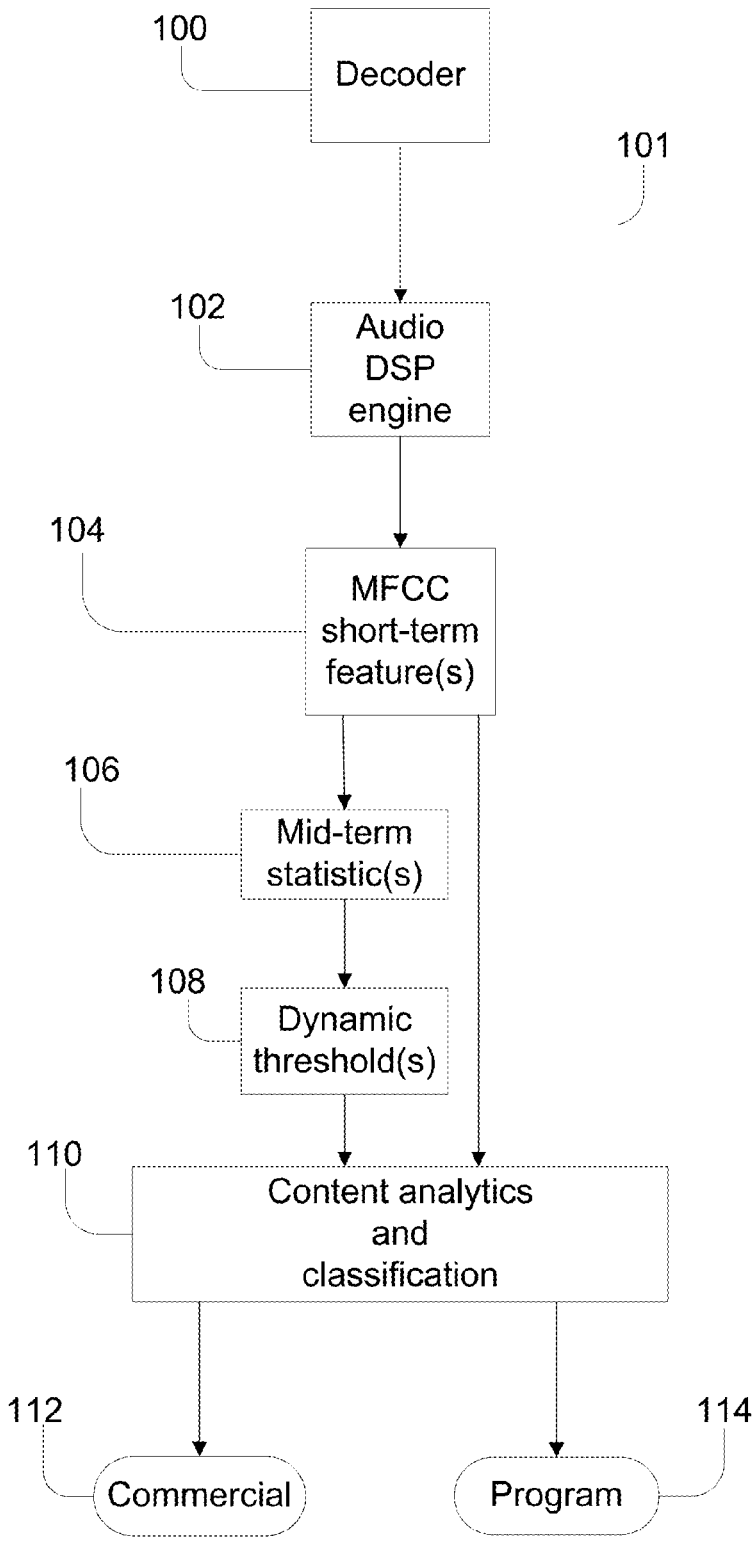
FIG. 1 is an example block diagram illustrating a system overview for a content identification system.

FIG. 1 illustrates an example system and processes for classifying content. A process may begin by detecting a plurality of audio streams 101 that have segments which contain one or more advertisements and programs. In this document, the term data stream may not be limited to a broadcasting of the data, but encompass any kind of codified video, whether it is stored or broadcasted. The detection of the aforementioned segments, each of which contains an unidentified advertisement, may be optionally be performed as follows (although any of the methods described in U.S. Pat. No. 8,825,188, the content of which is incorporated herein by reference in its entirety, or any other equivalent may be used.)

Advertisement segments may be identified by a decrease in the audio signal points in the audio stream whose minimums are first located. Optionally, this may be performed by an analysis engine extracting audio features on a short term basis 104. By way of example, Mel coefficient #1 may be extracted on a short term basis 104 and optionally processed to amplify near silence or quiet audio. Additionally, a method for selecting an optimum or desirable window/step sizes may optionally be utilized. Mid-term processing 106 may optionally be performed by the analysis engine on the short term processed Mel coefficient #1 104. Optionally, dynamic or distinct threshold 108 calculations may be performed by the analysis engine to detect and classify near silences, where the threshold may optionally act as a ceiling for audio content to qualify as a near silence. Near silence or quiet audio discernment and content classification rules 110 may optionally be utilized by the analysis engine to discern advertisements 112, advertisement segments 112, and/or program segments 114. The audio content 101 may have been received at an input port (e.g., in the form of a bitstream), communicated to a multichannel audio decoder 100 which decodes the audio content, and converted to another digital format such as a WAV, AIFF, MP3, MPEG, AAC, AC-3. ALAC, ALS file or bitstream, or other format.

In a further aspect of the disclosure, a description of optional device automation is provided. By way example, automation may include content chapter menus, content based volume automation, customized ad viewing, and/or variable ad skipping speeds.

A example distribution system 1801 may be configured to deliver content classifications and time locations 1802 either recorded or in real-time, (e.g., as the content may be received), to multimedia content delivery device(s) 1803 (e.g., a digital video recorder (DVR), smart phone, TV, tablet, laptop, desktop computer, game console, wearable device, and/or other devices) via a remote server, a local server, Ethernet, Bluetooth®, RF, integrated software, and/or other delivery methods. The end devices 1803 may be connected with a server via a network. The audio signal(s) may reside in or be processed within the server 1804. The server 1804 may perform any or all of the functions described within the embodiments herein, including but not limited to, signal processing, lossy transcoding (for more information on examples of the generation and processing of lossy signals, see U.S. Pat. No. 8,825,188, the content of which is incorporated herein by reference in its entirety), down mixing, signal transforms, filtering, short and/or mid-term processing, audio feature extraction, classify advertisement segments, derive timestamps of advertisement content segments, update an entry within a database and when requested, the content distribution server 1801 may return the identification information (e.g., classified timestamps) 1802 to the end device(s) 1803. The end devices 1803 may include a digital video recorder (DVR), smart phone, TV, tablet, laptop, desktop computer, game console, wearable device, and/or other electronic devices. The network may be any interconnection such as Internet, radio link, wired or wireless. The server 1804 may be a computer with or without database(s). The present disclosure may also apply to standalone devices and/or servers.

By way of example, a multichannel audio decoder 100 (which may be configured to decode WAV, AIFF, MP3, AAC, AC-3. ALAC, ALS, or other audio formats) may optionally be utilized and one or more DSP parameters may be optionally bypassed (e.g., dialogue normalization, dynamic range control, down-mixing, surround formats, bass management, and/or channel delay). After bypassing the DSP (which may be included in the decoder 100), a plurality of decoded audio channels 101 may be optionally down-mixed 102 utilizing the following technique:
Where:
DM=Down-mix channel
L=Left audio channel
R=Right audio channel
C=Center audio channel
Ls=Left surround audio channel
Rs=Right surround audio channel DM=((L+(C−3 dB)+(Ls−3 dB))−3 dB)+((R+(C−3 dB)+(Rs−3 db))−3 dB)

Figure 2:
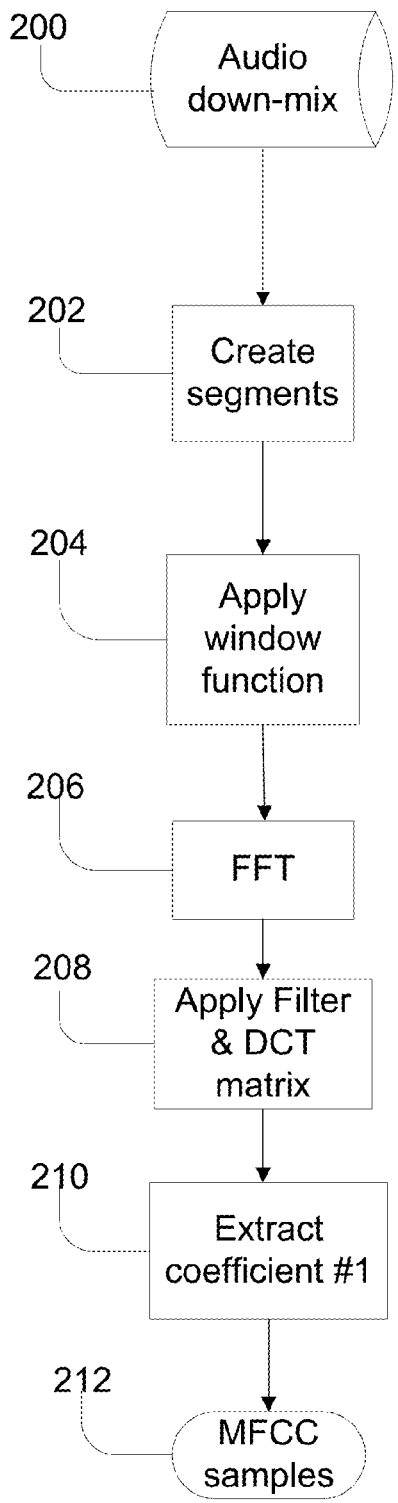
FIG. 2 is an example block diagram of example short term features producing Mel-frequency cepstral coefficients (MFCCs).

FIG. 2 illustrates example methods that, after the audio signals (e.g., pulse coded modulated (PCM) audios signals) have been down mixed 200, optionally buffer the samples into 'N' samples, sometimes referred to herein as frames. The frames may be optionally subdivided into segments (e.g., short-term segments) 202 (sometimes referred to herein as windows) and are optionally broken into overlapping segments, also known as steps. Steps may also be considered as the number of samples to move forward/advance to locate the starting sample where the next window may be begin being filled. The short term window and step size may optionally be dynamically determined by utilizing decoder delay intervals to detect content splice points 600, 601, 602 where significant near silence exists. Techniques for calculating short term window width and step size are discussed elsewhere herein. Typical values for a short term window width may optionally be in the range of 2 ms-50 ms, or more narrowly, between 5 ms-20 ms, or even more narrowly, between 8 ms-14 ms. A significant silence (or near silence) indicates a change in content type (e.g., from a program to an ad). A non-significant silence (or near silence) indicates a silence that occurs within a given content, such as within a program, as opposed to between content types. Additionally, content splice points 600, 601, 602 may optionally be defined as points in a stream that provide opportunities to switch from one source content to another 601, 602, (e.g., from a program to an advertisement), and the shortest decoder delay time may be defined as the time required for the decoder (e.g., decoder 100) to process a single audio frame. Because content splicing may occur at frame boundaries, the time it takes to decode a single frame (or approximately the time it takes to decode a single frame, plus or minus a relatively small time period, such as 10% or 15%, or 20% of the frame decode time/decoder delay) may be optionally used as the window size. By way of example, if the decoder's delay time may be 11.7 ms, the short-term window size may optionally be 11 ms, corresponding to 528 audio samples, while other durations may be possible. This window size may optionally amplify the significant silences 600 and reduce the undesired shorter duration silences within a program. The decoder delay processing time, and therefore the window and step size may, be derived in accordance with the following:
Where:
TBR=Transmission bit rate in Kbps
WD=Window duration in ms
SD=Step duration in ms
WS=Window size in samples
SS=Step size in samples
Roundup=Function to round up to next nearest value
Fs=Sample rate, e.g., 48,000

WD=Roundup((0.00575+(TBR*0.000000011))

SD=Roundup(WD*0.363636)

Example:

11 ms=Roundup(0.00575+(448000*0.000000011))

4 ms=Roundup(11 ms*0.363636)

WS=Fs*WD

SS=Fs*SD

Example:

528 samples=48,000*0.011

192 samples=48,000*0.004

Figure 11:
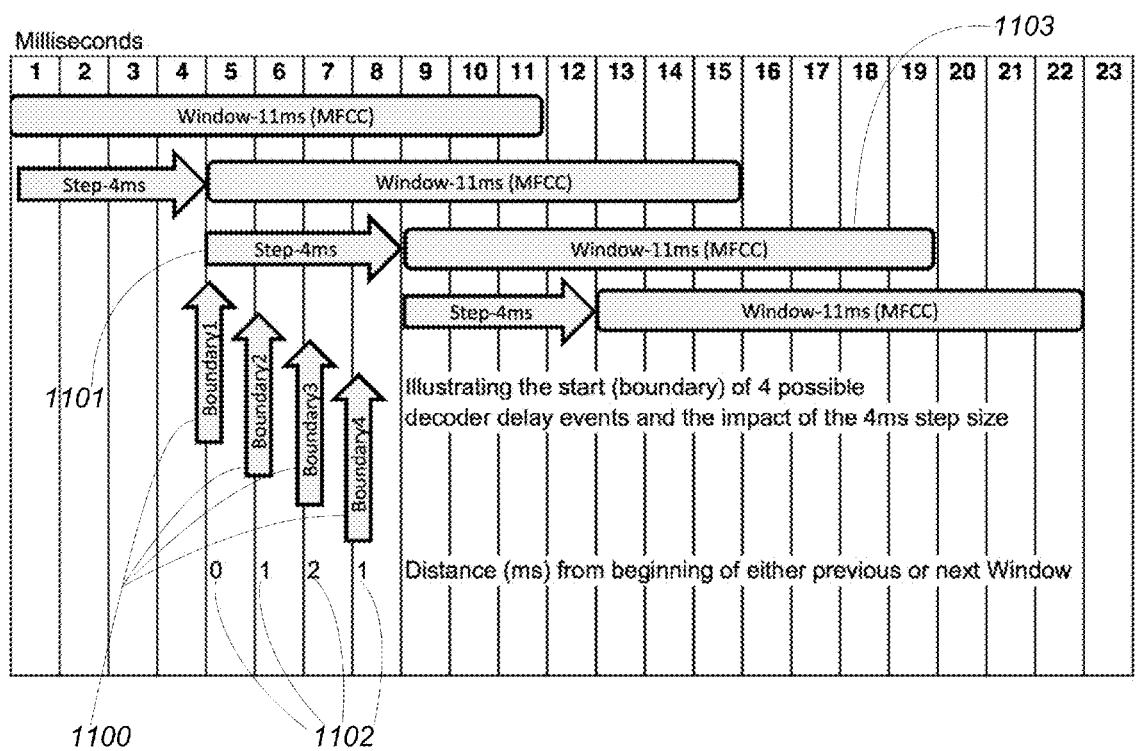
FIG. 11 is a diagram of MFCC#1 over a 23 millisecond time period illustrating windows, steps and splice boundaries.

FIG. 11 illustrates example methods for increasing the precision of aligning the starting sample for windows 1103 as close as possible to the frame boundary (e.g., the leading and trailing edges of the 11 ms frame) 1100 by optionally using a step size 1101 (e.g., a 4 ms step size), which may correspond to 250 short-term features produced per second. The 4 ms step size 1101 may optionally insure the start of the majority of short-term windows may usually be never more than 2 ms (or other desired threshold time period) from a frame boundary 1102.

Figure 12:
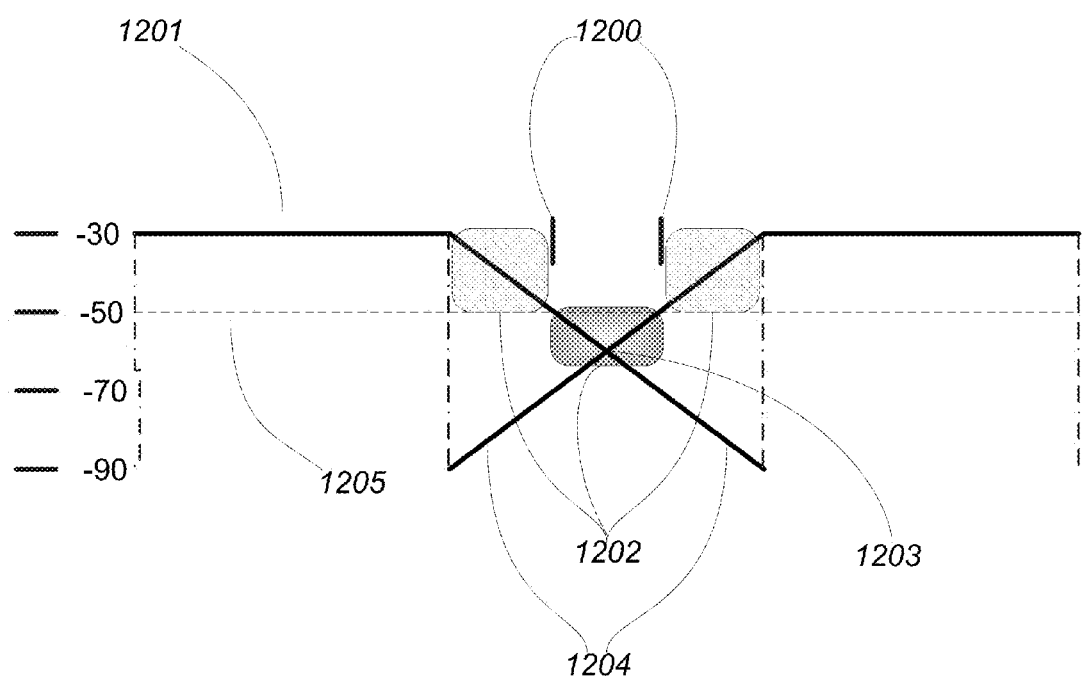
FIG. 12 is a diagram illustrating window size of ⅓ of a decoder frame size that may increase significant event detection accuracy.

FIG. 12 illustrates optional techniques for determining the short term window size. The window size may be determined by using the ⅓ frame size method. For example, if a window size is approximately 32 ms 1201, an optional window size may be ⅓ 1200 of 32 ms, or rounded to 11 ms 1202. Utilizing a ⅓ frame window size 1200 with an optional 4 ms step size may increase the precision of aligning as close as possible to the midpoint 1203 of a crossfade 1204. Aligning to the midpoint of crossfades may enhance the detection of quiet or near silence audio that may lie below a threshold 1205.

As will be described in greater detail herein, mel coefficients may be determined by framing an audio signal into short frames (e.g., approximately the audio decoder delay time), calculating an estimate of the power spectrum of each frame to identify which frequencies are present in the frame, applying a mel filter bank (which may utilize triangular filters) to the power spectra, obtaining and summing the energy in each filter, applying a DCT matrix to the filter bank energies to generate DCT coefficients. Unlike conventional approaches to content detection, an optional aspect of the disclosure relate to using the first coefficient (sometimes referred to herein as MFCC #1 or MFCC 1) to detect silences (or near silences) between content and to thereby detect content (or to detect types of content), rather than DCT coefficients 2-13 and/or 14-26.

By way of example and with reference to FIG. 2, a window function 204 may optionally be employed, such as the Hamming window, utilizing the short term processing, although other windows, (e.g., a Hann window) may be employed. The window function is a mathematical function that is zero-valued outside of some chosen interval.

After the optimal window and step sizes 204 have been applied, a set of audio features (e.g., coefficients) may optionally be extracted 210. By way of example, near-silent or quiet audio frames may optionally be identified by extracting audio features such as Mel-frequency cepstral coefficients (MFCC) 212. In this system, the 1st coefficient may optionally be utilized as the preferred coefficient as it has been processed to output dBs (decibel) log scale, amplifying quiet audio and/or near silence. The Mel-frequency cepstrum (MFC) is a representation of the short-term power spectrum of a sound, based on a linear cosine transform of a log power spectrum on a nonlinear mel scale of frequency. The mel scale relates human perceived frequency of a pure tone to its actual measured frequency. Mel-frequency cepstral coefficients are coefficients that collectively make up an MFC. MFCCs are derived from a type of cepstral representation of the audio clip.

MFCCs 212 may optionally utilize a filter (e.g., a pre-established triangle filter) and optional DCT matrix 208. The filter and matrix 208 may optionally be used with each FFT 206 on a short term processing basis. For example, the triangle filter 208 may utilize 42 frequencies where the first 13 frequencies may be linear, beginning in this example with frequency 133.333 Hz, increasing by 66.66667 Hz and may end at frequency 933.333 Hz. Frequencies 14-42 may optionally be set as increasing based upon log spacing. The fourteenth frequency may optionally be, in this example, 1,070.9 Hz and end with the forty-second frequency as 6,853.8 Hz. The foregoing are example frequencies, however, other frequencies and/or spacing between frequencies may be used. Because decoder delay times may in part be perceptually motivated, this scale optionally may improve discerning significant near silence or quiet audio from non-significant silence or quiet audio.

The DCT matrix 208 for the 1st coefficient may optionally be set as 0.2236*(sqrt(2)/2) which equals 0.1581 over the specified frequencies, e.g., 40 frequencies. The 1st coefficient (because it may be a constant and a positive number) may optionally retain log 10 coefficient values. For each short term window, a set of 13 MFCC values may optionally be generated, representing coefficients 1-13. The 13 MFCC coefficients may optionally be produced by computing the matrix product of the above base set of specified dB (decibel) values and optionally the DCT Matrix 208. The 1st MFCC coefficient 210, 212 may then optionally be extracted and mid-term processed. As described below, unlike conventional techniques, optional techniques described herein utilize the first MFCC coefficient which unexpectedly provides for more accurate detection of content-type transitions, with less false positives than such conventional techniques.

Optionally FFT's 206 may be derived for each short-term feature window consisting of values spread evenly over 256 frequencies starting at 0.0, incrementing evenly by 187.5 and ending at frequency 47,813, with others possible. A subset of dB (decibel) values (representing frequencies starting at 187.5, incrementing evenly by 187.5 and ending with 7,500) may optionally be extracted from the FTT 206 by optionally computing the matrix product of the triangle filter and the FFT 206.

Bitstreams may contain errors, therefore by way of example, methods for removing these errors may optionally mid-term process Mel coefficients to extract statistics, (e.g., to identify the maximum errors). The optimal window size of 280 samples may be optionally input from short term processing and optionally utilize an overlap of 0. To remove the errors, Mel coefficient values may be optionally altered that exceed the corresponding mid-term maximum by a defined percentage, such as 4% by way of example, while other percentages may be possible.

Figure 3:
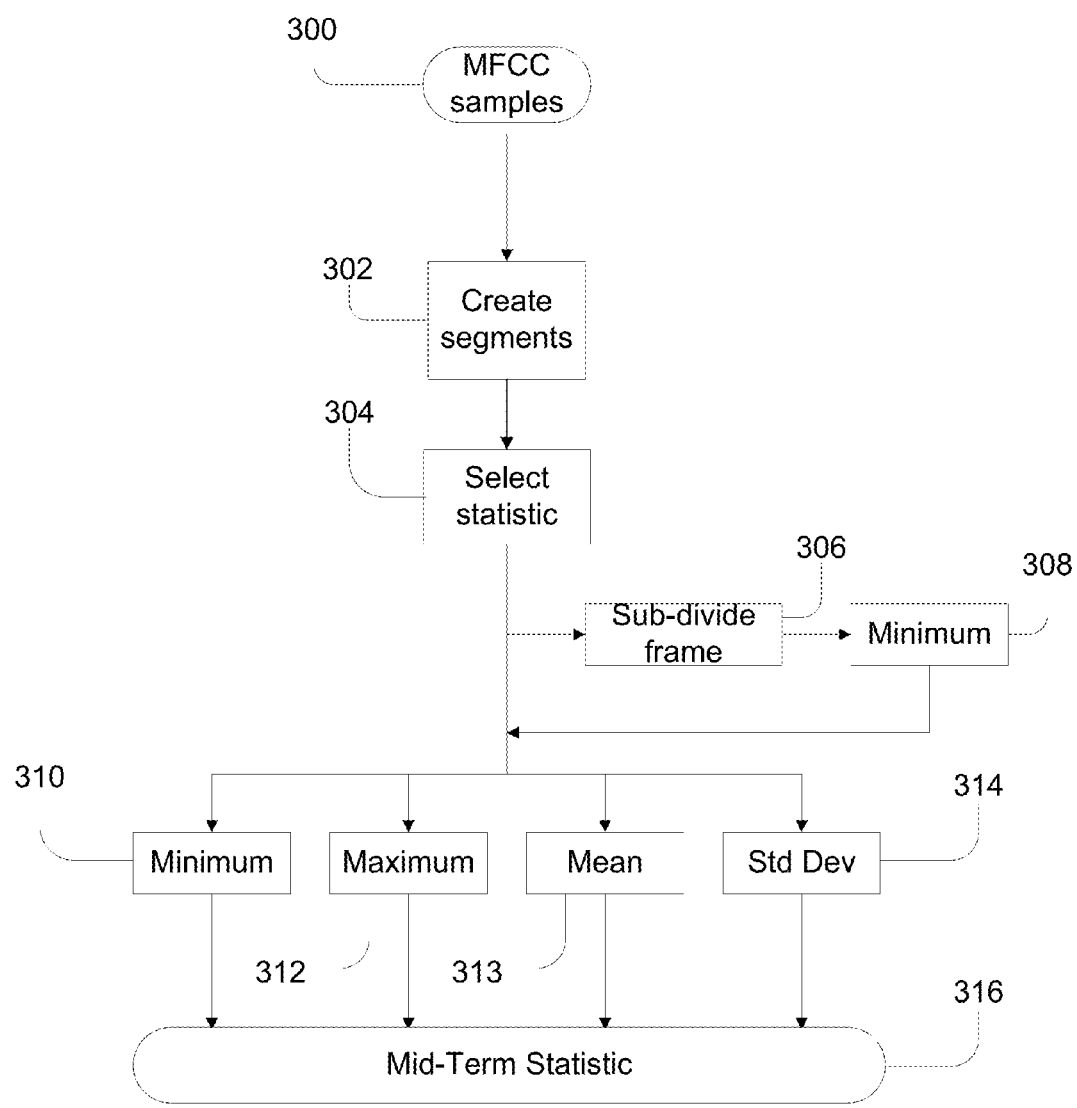
FIG. 3 is an example block diagram of example mid-term statistics.
Figure 6A:
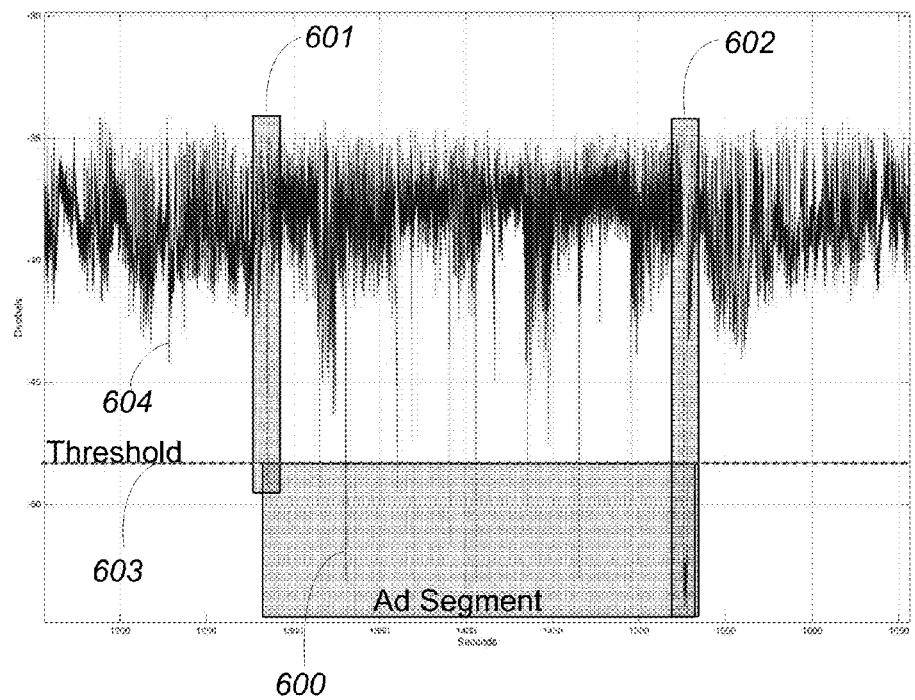
FIG. 6a is an example time plot of short-term processed Mel Coefficient #1 (MFCC #1) and an example dynamic threshold.
Figure 6B:
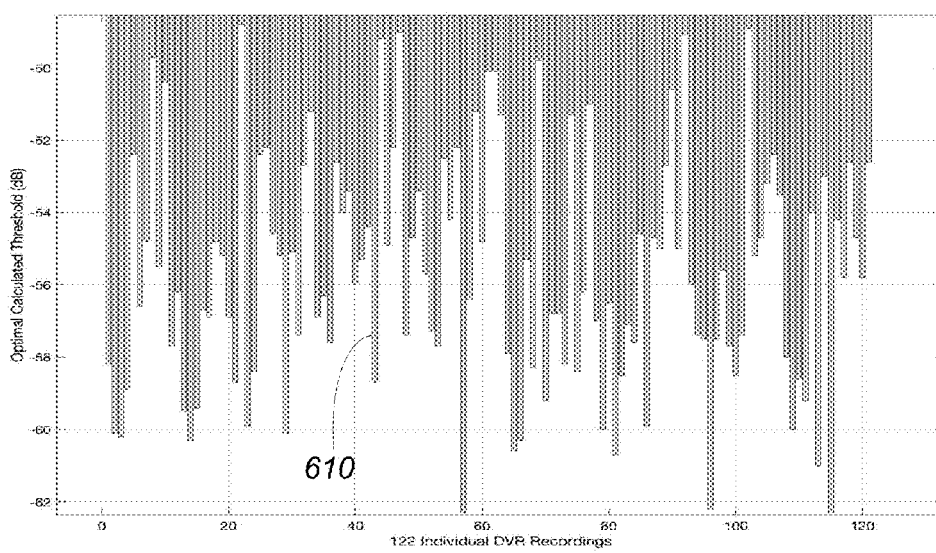
FIG. 6b is an example histogram plot of the example dynamic threshold.
Figure 7:
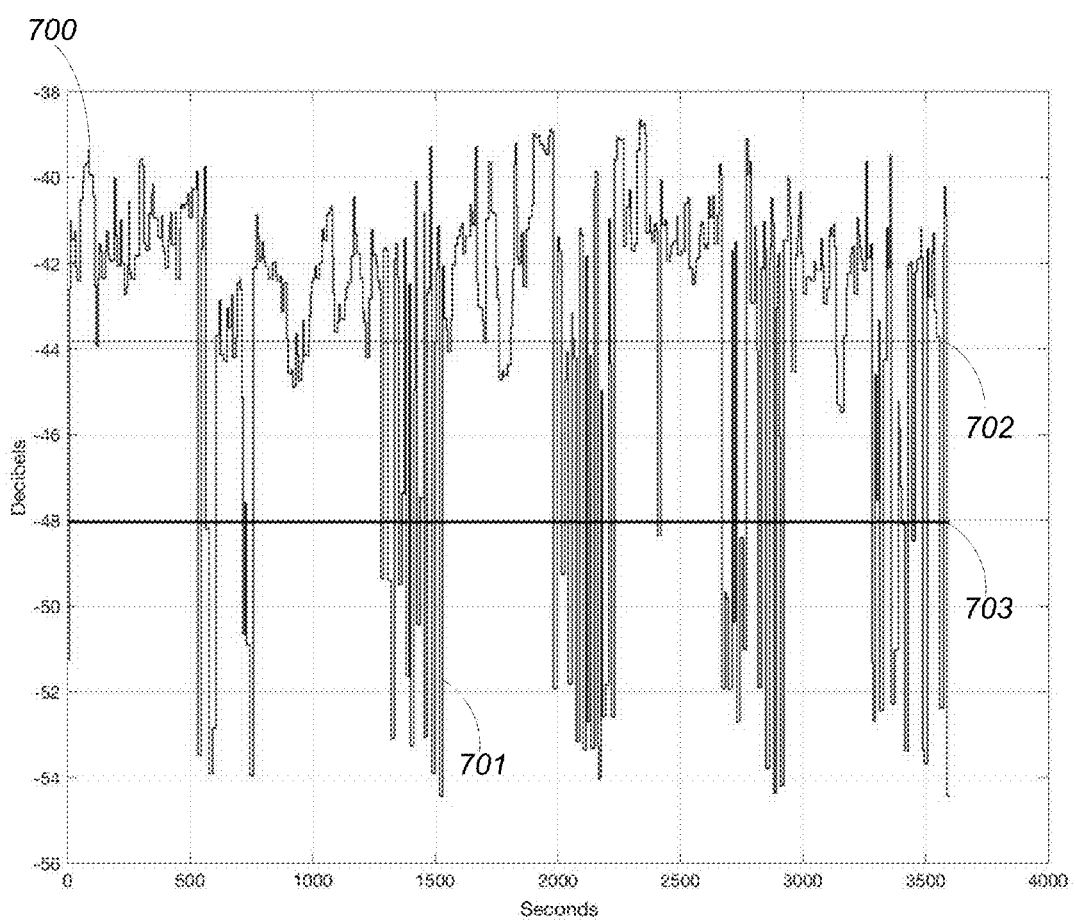
FIG. 7 is an example time plot of the mid-term processed statistic of minimum, mean and standard deviation.

FIG. 3 illustrates example methods where short term processed Mel coefficients (e.g., MFCC #1 300) may be optionally mid-term processed to extract statistics 304 (e.g., the minimum Mel Coefficient #1 values over the entire set (duration of content)), 310, 700, 701 for optionally calculating a dynamic threshold 603. FIG. 7 illustrates an example time plot of the mid-term processed statistic of minimum, mean and standard deviation. The short term processed Mel coefficients (MFCC #1) 300 may be optionally subdivided into mid-term segments 302 (windows) and optionally broken into overlapping segments 302, with each moving forward in time by a given number of samples, also referred to herein as steps. The result of the mid-term processed MFCCs #1 may be a vector of feature statistics 316 where minimum 310, 701 may be preferred, where others may be possible, (e.g., maximum 312, mean 313, standard deviation 314, or the like). An optional dynamic threshold (see, e.g., FIG. 6a) may be accomplished by optionally performing mid-term processing over each new piece of content thus, optionally, the same threshold may be utilized throughout a given item of content (e.g., a program), but a new/different threshold 610 (see, e.g., FIG. 6b which illustrates a histogram of the dynamic threshold applied over 122 programs) may be utilized for each new, different item of content (e.g., a different program). The use of such dynamic thresholds provides for more accurate detection of content transitions as compared to the use of conventional static thresholds, with less false positives. The calculation of the mid-term window and step may optionally utilize the following methods, with others possible.

Short-term step samples (e.g., 192 short-term step samples) may be optionally decimated by a factor of 6 to derive the preferred mid-term step size of 1152 samples, (e.g., 192*6=1152), although other factors may be used. The preferred mid-term window size of 3200 samples may optionally be found by extracting the short term window step percentage in order to divide the mid-term step by the short term window step percentage (e.g., step-to-window percentage=4 ms/11 ms=36%) (e.g., mid-term window size=1152/0.36=3200). The mid-term window/step may be optionally expressed as seconds rather than samples, (e.g., mid-term window of 12.8 seconds and step of 4.6 seconds). For example, a mid-term window width may optionally be in the range of 0.5 seconds to 15 seconds, or more narrowly within the range of 1-13 seconds. The mid-term window may optionally be about one, two, three, or four magnitudes greater in width than the short-term window (e.g., the mid-term window may be about 10-10,000 times the width of the short term window width, or more narrowly, between about 500-1500 times the width of the short term window width).

The mid-term window and step size selections may optionally be selected to assure at least one mid-term window fits within the near-silence (or silence) on either side of an advertisement. The derived mid-term window/step duration times may optionally separate significant from non-significant events 700, 701, (e.g., MFCC #1), improve threshold calculation with regards at least to the mean 702 and standard deviation 703, and harmonize well with the content classification rules.

Figure 4:
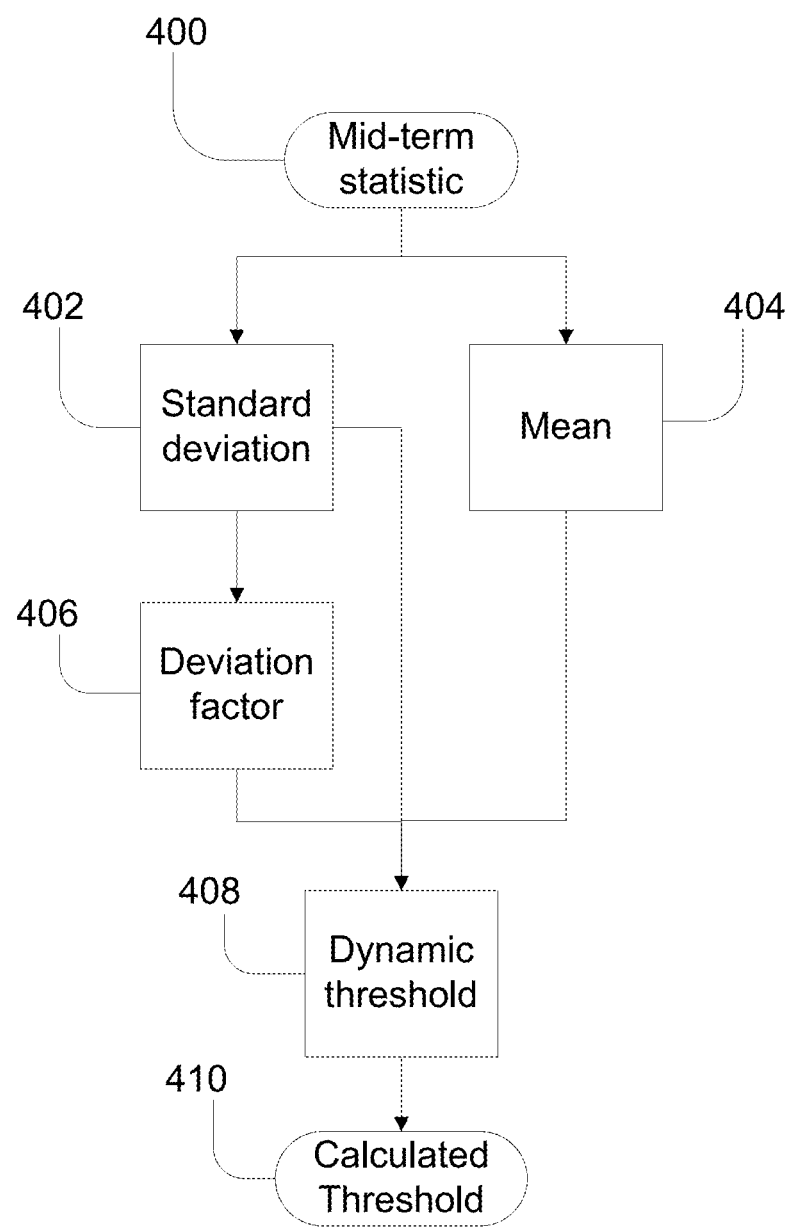
FIG. 4 is an example block diagram example for calculating an example dynamic threshold.

FIG. 4 illustrates example methods where the dynamic threshold 410 may be derived by utilizing mid-term statistics 400 (e.g., the minimum) and other calculations including, by way of example, standard deviation 402 and mean 404. Optionally, the dynamic threshold 410 results in a single threshold value applied over the entire content, although optionally multiple threshold values may be used over a given item of content. The standard deviation 406 and mean 404 may optionally be derived from the minimum over the total running time of the content with other methods possible. A factor 406 may optionally be applied to the standard deviation 402. For example, a factor may be applied by dividing the standard deviation 402 by a factor constant 406 (e.g., 16 or other appropriate factor constant).

The optimal dynamic threshold 408, 410 may be derived where:

DT=dynamic threshold
MTS=set of mid-term statistics, (e.g., minimums)
F=factor as a constant, (e.g., 16)
mean=average of set
std=standard deviation of set $$DT = (\text{mean}(MTS) - \text{std}(MTS)) - \left(\frac{\text{std}(MTS)}{F}\right)$$

For example:

−60.3125 dB=−55−5−(5/16)

The derived optimal threshold 410 may optionally be applied over the entire content duration of the short term output Mel coefficient (e.g., MFCC #1) for discerning significant near silence 600 and quiet audio from non-significant near silence 604 and quiet audio.

FIG. 3b illustrates example methods for determining how to calculate an alternate threshold that may be utilized to detect significant MFCCs. An alternate threshold may begin with mid-term processing the MFCCs 300 and producing a set of mid-term statistics 316 that may be spaced evenly over the entire content. The mid-term statistics optionally may produce an alternate threshold that may be dynamic, therefore moving throughout the content, by reacting to changes in the short-term MFCCs values 300. This dynamic, moving threshold, may optionally further enhance the detection of significant MFCCs 300. Optionally, the mid-term may utilize a window size of 1064 with a step size of 266, while other values may be possible. Each mid-term window may optionally be subdivided into segments (e.g., 8 segments) 306 of equal length, while other numbers of segments may be used, and the minimum statistic 308 value may be located for each segment. An optional mid-term statistic 316 may then be derived as the mean 313 of the set of minimum statistics, while other statistics may be used, such as, by way of example, minimum 310, maximum 312, mean 313 or standard deviation 314. Optionally, a moving dynamic threshold may be calculated as the standard deviation 314 of the MFCCs 300 multiplied by 2 and then subtracted from each element within the mid-term 316.

A content analytics and classification system, such as the example illustrated in FIG. 5, may be provided for classifying individual advertisements 507, advertisement segments 505 and program segments 506, by extracting significant events from MFCCs 510, comparing the extracted significant events to thresholds 511, resolving undesirable significant events 502, and performing classification analytics to classify content (e.g., as an ad or a program). The output from the content classification analytics may provide for downstream automation actions (e.g., fast forwarding, volume control, etc.) which may be based in part, but not limited to, user initiated actions or machine initiated actions within a variety of consumer and/or professional devices.

FIG. 5 illustrates example methods for extracting significant events and corresponding time codes 500 from short-term processed audio features, (e.g., MFCCs 511). The methods may optionally utilize a dynamic threshold 511. Significant events 500 may be defined as MFCCs 510 less than or equal to a dynamic threshold 511 (indicating a transition in content type). Optionally, significant events 500 may be extracted with corresponding time codes (indicating when the significant events occurred) for further processing, while other comparisons and values may be possible. Significant events optionally may be further decimated 501 by selecting the minimum MFCC value and corresponding timestamp on a periodic (e.g., second by second) basis 501, while other selection methods and time periods may be possible.

FIG. 5 illustrates example methods for classifying significant events 500, such as advertisements 507, advertising segments 505, and program segments 506 and the transitions between the foregoing by optionally utilizing significant event timestamps and durations. Optionally, extracted significant event timestamps 500 may be classified as advertisements 507 by measuring the duration between adjacent significant events 500. By way of example, if the duration between pairs of significant event timestamps 500 may be less than or equal to 120 seconds, the significant events may be classified as advertisement content 504, while other durations may be used (e.g., 30 seconds, 60 seconds, 90 seconds, 180 seconds, etc.). For example, it may prove beneficial to limit the duration to 90 seconds or increase the duration to 150 seconds. Optionally, the identification of advertisements 507 may be further refined by restricting advertisements 507 to the duration of pairs of significant events that match a predefined advertisement duration.

By way of example, the beginning of an advertising segment 505 may be identified when the first occurrence of a time difference between two adjacent significant event timestamps may be less than or equal to 120 seconds 503, while other time durations may be used as desired. Optionally, the end of an advertisement segment 505 may be identified when the first occurrence of a time difference between two adjacent significant event timestamps exceeds 120 seconds 505, while other time durations may be used as desired. Content may optionally be classified as program segments 506 when the time duration between pairs of significant event timestamps exceed a threshold value, such as 120 seconds, while other optional durations may be used. For example, it may prove beneficial to limit the duration to 90 seconds or increase the duration to 150 seconds.

Figure 9:
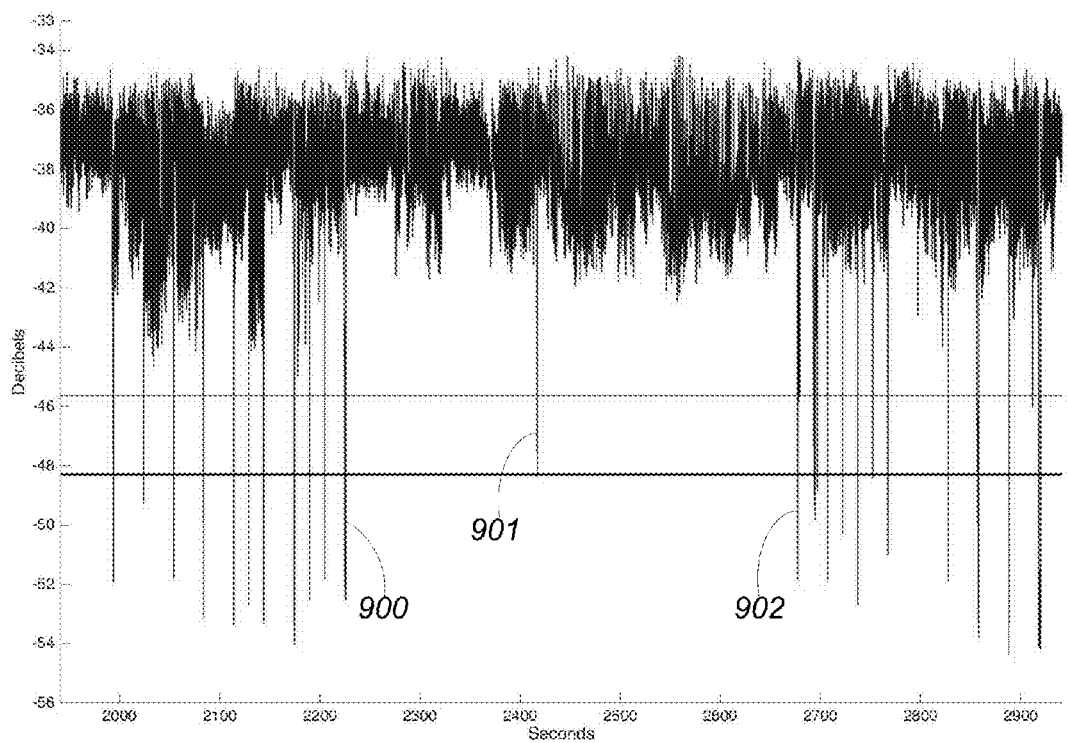
FIG. 9 is an example time plot of an MFCC #1 illustrating a transient MFCC.

FIG. 9 illustrates an example time plot of an MFCC #1, illustrating a transient MFCC. Example methods for removing undesirable significant events, known as transients 901, are now described. A transient 901 may be identified when the time difference between two pairs of adjacent significant events 900, 901 and 901, 902 both exceed 120 seconds (or other appropriate time period). The transient event may optionally be defined as the significant event in the middle 901 of the two pairs of adjacent significant events, while other optional time durations and methods may be used. Optionally, when a transient event is identified 901, it may be removed or ignored. For example, a first of two pairs of adjacent significant events 900, 901 may have a duration of 180 seconds while a second adjacent pair 901, 902 may have a duration of 260 seconds. The transient in this example may be identified as the middle event 901. In addition, the middle event 901 may optionally be removed leaving only two significant events 900, 902 with a combined duration of 440 seconds. Optionally, it may prove beneficial to limit the significant event duration to 90 seconds or increase the duration to 150 seconds (or other duration).

By way of example, one or more methods may be utilized for defining optional rules to detect those significant events below and/or above the dynamic threshold. Optionally, rules may be defined to correct errors that may be unique to or tend to occur with greater frequency in specific genres of content (e.g., news content, musical concert content, sporting event content, commercial free content, etc.). The following set of rules may optionally be applied before and/or after the primary detection methods and may identify previously undetected significant events. The optional rules described herein may be applied in isolation, in combination with other rules, or in diverse orders depending on implementation needs.

Figure 10:
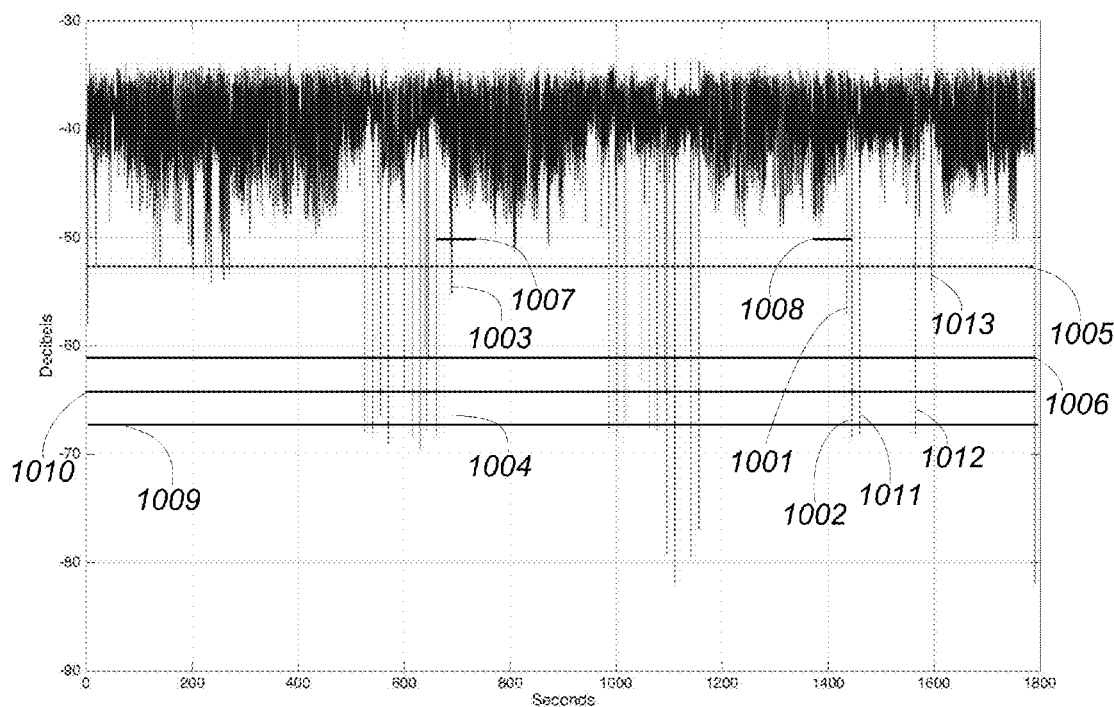
FIG. 10 is an example time plot of MFCC #1 illustrating a plurality of calculated thresholds that may be used during significant event detection.

FIG. 10 illustrates an example time plot of MFCC #1 depicting a plurality of calculated thresholds that may be used during significant event detection. Example methods are described, with reference to FIG. 10, for classifying content if the preferred or initial classification methods produce a total duration of advertisements that may be less than a predefined minimum percentage, such as 11 percent, while other percentages and methods of determining lower boundaries may be possible. If the advertisement percentage falls below the predefined minimum, the preferred threshold optionally may be recalculated to a new value 1005, and significant event detection and classification may be attempted. Optionally, the cycle may be repeated until the minimum advertising duration percentage rises above a minimum threshold value, while the number of repetitions may change, or other methods may be utilized. All the example methods described herein, or any set of individual methods invoked in any order may be used during the repeated event detection and classification The following example methods may be utilized for reclassifying content classified as advertisements as programs when significant event durations do not match certain predefined advertisement durations. Thus, content that had been classified as an advertisement may be reclassified as a program (or vice versa). Optionally, this reclassifying process may continue until an advertisement is encountered that matches predefined advertisement times. By way of example, if the first advertisement in an un-identified segment equals 17 seconds, it may optionally be reclassified as a program because it may not match a predefined advertising duration (e.g., 30 seconds).

The beginning and end of content may exhibit random significant event timings which may increase the difficulty in accurate content classification. By way of example, optional methods for overriding previous classifications and reclassifying a first period (e.g., the first 60 seconds) and/or a last period (e.g., the final 60 seconds) as a program segment may be utilized, while other optional durations may be possible ranging from zero up to the length of the content. Optionally, the final 60 seconds (or other duration) of content may be classified as a program. The duration optionally may be set to the length of the content to resolve those conditions where the content may be commercial free.

An example method may optionally provide for changing an advertisement classification to program if the duration of the first and/or last pair of significant event timestamps within an advertisement may be greater than a specified duration (e.g., 60 seconds 30 seconds, 40 seconds, 90 seconds, or other duration).

As noted above, FIG. 10 is an example time plot of MFCC #1 (the first coefficient) illustrating a plurality of calculated thresholds that may be used during significant event detection. Methods for enhancing the identification of advertisement segments will be described with reference to FIG. 10 to overcome potential error conditions, such as when two advertisement segments 1001, 1002, 1011 and 1012, 1013 may be separated by a segment erroneously identified as a program segment 1011, 1012 whose duration may be suspect. When the central, or middle program segment 1011, 1012 duration is less than a defined minimum value (e.g., 140 seconds, or other defined duration), the central program segment 1011, 1012 may optionally be reclassified as an advertisement segment, which may result in a contiguous, longer duration advertisement segment 1001, 1002, 1011, 1012, 1013. By way of example, three segments consisting of an advertisement segment of 60 seconds, followed by a program segment of 125 seconds, followed by another advertisement segment of 60 seconds may optionally be combined into one contiguous advertisement segment of 245 seconds duration. In another example method, an advertisement segment that is less than a defined minimum length (e.g., 120 seconds or other defined duration), may optionally be reclassified as a program segment which may result in a contiguous, longer duration program segment. By way of example, three segments consisting of a program segment of 600 seconds, followed by an advertisement segment of 56 seconds followed by another program segment of 144 seconds may optionally be combined into one contiguous program segment of 800 seconds duration.

Example methods may provide for correcting erroneously detected significant events within an advertisement segment where the duration of each may not follow predefined advertisement durations. Error correction may be utilized when summing two (or more) adjacent significant event time code durations that may result in a new time code duration that may be a predefined advertisement duration. Optionally, the first and second significant event time codes may be combined to form a single new significant event time duration. By way of example, the duration of the first and second pair of significant event time codes may be 13 seconds and 17 seconds which may not be predefined advertisement durations, however, when combined the total duration may be 30 seconds, which may be a predefined advertisement duration.

Figure 8:
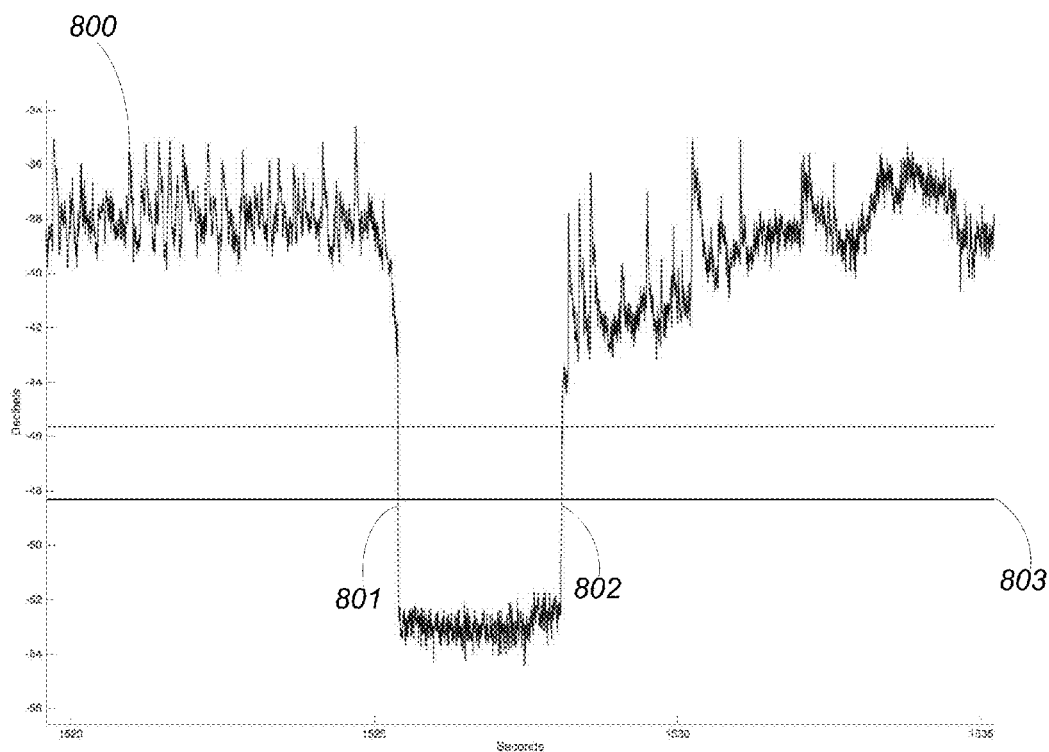
FIG. 8 is an example time plot of MFCC #1 during a transition illustrating accurate event timing.

FIG. 8 illustrates an example time plot of MFCC #1 during a transition illustrating accurate event timing achieved using example methods for achieving a finer grained timestamp resolution for detected short-term processed audio features 800 (e.g., with less than 1 second time resolution). Optionally, timestamps may be gathered on a per sample resolution, while other resolutions may be possible, to measure the timestamps when the short-term feature values cross 801, 802 the dynamic threshold 803 moving lower 801 and/or higher 802. For example, this finer time resolution may optionally enable improved timestamp accuracy for segment transitions, such as the transition entry 801 and transition exit 802 points, and may provide for increased wave form resolution for pattern recognition analysis other optional forms of analysis may be possible.

An incorrectly classified advertising segment may optionally be reclassified as a program segment when the total duration of an advertisement segment is less than a predefined minimum duration, such as 120 seconds while other optional durations both shorter or longer may be used. For example, in some instances 90 seconds or 180 seconds duration may prove beneficial.

FIG. 10 illustrates an example time plot of MFCC #1 illustrating a plurality of calculated thresholds that may be used during significant event detection performed using example methods for searching for new, previously undetected significant events 1001, 1003 that may be above the preferred threshold 1006 may increase detection accuracy. By way of example, one optional method may involve utilizing a previously defined alternate threshold 1005 and optionally detecting new significant events 1001, 1003, such as short-term processed audio features and associated time codes that may fall below the alternate threshold 1007, 1008. As an optional step, the new significant event durations 1001, 1002 and 1003, 1004 may be compared to predefined advertising durations, optionally within a margin of error, and those that match may be selected and those that do not match may be discarded.

With reference to FIG. 10, example methods are described for detecting new significant events 1001, 1003 above the preferred threshold 1006 by defining a set of optional validation steps and creating an optional secondary threshold 1007, 1008 that may begin prior to and extend past the advertising segment that may be used during a selection process. For example, the secondary threshold may extend 60 seconds prior to the beginning and/or 60 seconds past the end of an advertising segment, while other optional durations may be defined.

The following optional validation states may be defined with other methods, combinations, and values possible.

First and/or last significant event may be a predetermined percentage above or below a threshold (e.g., 8% below 1009 the primary threshold 1006).

First and/or last significant event may be a specified power (e.g., as specified in dB) above or below a threshold (e.g., 3 dB 1010 less than the primary threshold 1006).

The mean dB (decibel) value of all significant events within the ad segment may be a specified amount above or below a specified threshold (e.g., 9 dB less than the primary threshold).

Optionally, the validation states may vary by using different values depending on the genre of the content (e.g., dramas, sitcoms, reality, sports, animation, news, etc.). In addition, the validation states themselves may vary for each content genre.

If the specified validation states have passed, an optional secondary threshold 1007, 1008 may be calculated for each advertisement segment by adding a fixed dB, such as 18 dB to the first and/or last significant event 1002, 1004 in the advertisement segment, while other optional dB (decibel) values may be possible and vary by genre, such as 3 dB, 9 dB, 12 dB or 16 dB.

Optionally, the selection of new significant events 1001, 1003 that are below the secondary thresholds 1007, 1008 may be further restricted to a finite duration, such as 41 seconds, while other durations such as 30, 60, 90 seconds may be used. Optional methods may be utilized to reduce multiple detected significant events to a selected single significant event and time code.

Example reduction methods are now described:
Select the significant event with the lowest dB (decibel) value;
Select the first significant event duration matching a predefined advertisement duration;
Select the first significant event.

The above represents illustrative example reduction methods while others may be utilized with other values.

Significant events at the beginning and/or end of advertisement segments may exhibit dB values which do not fall below the preferred threshold value but detection may be desired. The following example method may utilize an optional threshold margin of error (MOE) for the selection of significant events. A MOE may optionally be calculated by adding and/or subtracting constants from the preferred threshold, such as optional values ranging from +/−0.01 dB to +/−20 dB. For example, if the preferred threshold is −65 dB and the MOE is +2 dB, then significant events that may be below −63 dB may be detected at the beginning and/or end of advertising segments. An optional MOE selection method may utilize a percentage of the preferred threshold to derive the MOE. For example, using 3% may result in a MOE of −63.05 dB, while other optional percentages and methods may be possible. The selection of significant events and corresponding time codes may optionally be further restricted by applying any of the example methods and rules herein.

By way of example, the patterns of program and advertisement at the beginning and/or end of content may follow a more random pattern, and as such, rules (if utilized) may become increasingly complex in order to distinguish between program and advertisement segments. Optionally, the beginning of content duration may be defined as 200 seconds while other durations, such as ranging from 0 to 600 seconds may be possible and may be unique for each genre. Optionally, the end of content may be defined as a percentage of the total content duration. For example, using a duration of 3,600 seconds, the final 2% of the content may be defined as end of content. Examples of detection methods may include an optional set of rules as described below.

Within the beginning of content, starting with the first significant event time code, inspect each time code and mark each pair of significant event time codes that is less than a defined minimum duration as advertisement segments. Optionally, the inspection of time codes may continue until the first duration is discovered that is greater than the defined minimum duration.

Optionally the remaining significant events within the beginning of content with durations matching predefined advertising durations may be marked as an advertisement, otherwise they may be marked as a program.

Locate the final advertisement segment. If the duration of the final pair of significant event time codes within the segment exceeds a predefined duration (e.g., 41 seconds or other defined duration), the final pair of significant events may be reclassified as a program.

Optionally, beginning at the final significant event time code, moving backwards, reclassify as a program those consecutive significant event time code durations that do not match predefined advertisement durations.

Optionally, the final pair of significant event time codes is reclassified as a program, although optionally several pairs may be classified as a program.

Other example detection methods may be possible utilizing other durations and timings.

The patterns of program and advertisement at the beginning and/or end of content may follow a more random pattern and as such the rules (if utilized) may become increasingly complex in order to distinguish between program and advertisement segments. Example methods to overcome the randomness may concatenate a system generated simulation of a predefined duration (e.g., 90 seconds or shorter or longer durations) of either program or advertisement content to the beginning and/or end of the content. An optional method to generate a simulated program segment may be achieved by replicating, at the same sample rate as the short-term coefficients, a constant value greater than the preferred threshold. For example, the value may be the mean of the short-term coefficients, while other values greater than the preferred threshold may be used. An optional method to generate a simulated advertisement segment within a simulated program segment may be achieved by replacing the simulated short-term coefficients, at periodic advertisement intervals with advertisement values that may be a value below the preferred threshold.

By way of example, methods may provide for the delivery of device independent synchronization of identified content segments, with respect to time-codes. Optionally, the output of each digital frame of data may be delivered in such a way that a standard decoder may reproduce identified content at the proper presentation time codes. This may enable equipment that receives bitstream data to accurately represent when the content in each frame may be reproduced. Optionally, to maintain synchronization of identified content segments, timestamps may be associated with a frame of data. The timestamp may indicate the time-code value that applies to an identified sample within a digital frame. Optionally, the timestamp may indicate an absolute time offset from a point in time of the stream, such as the beginning, while other offsets are possible, which optionally may enable an encoder to identify its own latency to another piece of equipment, (e.g., a set-top-box).

Further Example Aspects

In example methods, a plurality of audio channels (e.g., lossless or lossy trans-coded audio channels), may be short-term processed to extract the entropy of energy. The entropy of energy may be computed using the following example method, with others computations may be possible. Optionally, short-term frames may be divided into sub-frames of fixed duration. Optionally, the energy may be calculated for each sub-frame and may be divided by the total energy of the short-term frame. Optionally, the entropy of the sequence may then be computed. The resulting entropy value may be lower if abrupt changes in the energy envelope of the frame exist and this feature may be used for the detection of significant energy changes. Optionally, the following arguments may be utilized for short term processing of entropy of energy while other methods and parameters may be possible.

By way of example, the short term processing window length and step sizes may range from 1 to 5000 ms and sample rates may range from 8 kHz to 384 kHz. For example, the sample rate may be 48 kHz, an analysis window length may be 0.008 seconds and the step size duration may be 0.004 seconds, while other sample rates, lengths and time durations may be possible. Optionally, the mid-term statistic processing may utilize the extracted entropy of energy output to calculate statistics of interest, with other statistics and calculations possible. By way of example, the mean (or other central tendency) may be utilized as the statistic of interest, while other statistics may also be used. Optionally, the mid-term window length and step sizes may range from 2 to 15,360 samples. For example, the mid-term analysis window length may be 1250 samples and the step size length may be 125 samples while other window lengths and step sizes may be used.

By way of example, the identification of advertisement content may optionally utilize a calculated advertisement threshold value. Optionally, the advertisement threshold value may be determined using the standard deviation of a matrix from the mid-term statistic (e.g., mean or other central tendency, while other calculations and values may be possible). For example, values below 2.0 may be used to detect abrupt sound changes in advertisement content.

In example methods, one or more channels may be short term processed to extract the Zero-Crossing Rate (ZCR). Optionally, the ZCR may also be interpreted as a measure of the noisiness of a signal. For example, a ZCR may exhibit higher values in the case of noisy signals and the ZCR may also reflect, in a coarse manner, the spectral characteristics of a signal. Optionally, the following arguments may be utilized to calculate the zero-crossing rate, while other appropriate arguments may be used. The short term processing window length and step sizes may range from 1 to 5000 ms and sample rates may range from 8 kHz to 384 kHz. For example, the sample rate may be 48 kHz, the short-term analysis window length may be 0.003 seconds and the step size may be 0.0015 seconds, while other appropriate sample rates, window lengths, and/or step size may be used. Optionally, a mid-term statistic, (e.g., standard deviation and/or mean) may be calculated using the following arguments, although others statistics and mean tendencies may be used. The mid-term window length and step sizes may range from 2 to 5,360 samples. For example, the mid-term analysis window length may be 300 samples and the step size may be 150 samples. Optionally, an interim threshold may be determined by calculating one or more statistics, (e.g., standard deviation and/or mean, while other appropriate techniques may be used), from a mid-term matrix of observations. Optionally, the threshold range may be determined by both adding the standard deviation to the mean and/or subtracting the standard deviation from the mean, while others techniques for determining the threshold range may be possible.

By way of example, zero crossing analysis and rules may provide a system for identifying program and advertisement content. For example, when the mid-term statistic values of the zero crossing are predominantly within the threshold range, the content may be classified as advertisement and when the values of the zero crossing are predominantly above or below the threshold range the content may be classified as program. The foregoing example analysis and rules represent one possible method, while others may be possible.

By way of example, the following method and parameters may be utilized for spectral flux extraction with other methods and parameters possible. Optionally, the short term processing may utilize a down sample methodology, while other appropriate methodologies may be possible; the window length and step sizes may range from 1 to 5000 ms and sample rates may range from 8 kHz to 384 kHz. For example, the sample rate may be 48 kHz, an analysis window length may be 0.024 seconds, and the step size length may be 0.0792 seconds, while others may be possible. Optionally, the mid-term processing may utilize the extracted spectral flux to calculate the minimum statistic, with other statistics and calculations possible. By way of example, the following represents one optional method where the minimum may be utilized as the statistic. Optionally, the mid-term window length and step sizes may range from 2 to 15,360 samples. For example, the mid-term analysis window length may be 24 samples and the step size length may be 8 samples, with other window lengths and steps possible. Optionally, in a further process values equal to 0 may be transformed to equal 1 and all remaining non-zero values may be transformed to 0, while other transformations may be possible. Optionally, the summation of transformed values may be calculated utilizing a window length of 30 seconds, and a step size of 1, with others possible. Optionally, a dynamic threshold, such as mean, standard deviation or standard deviation subtracted from mean may be calculated from the mid-term sequence of statistics, (e.g., summation of the transformed values, while other appropriate calculations may be used). For example, the dynamic threshold may be found using the matrix of mid-term statistics by means of the standard deviation, the mean or the standard deviation subtracted from the mean, while other formulas may be possible. Optionally, the dynamic threshold and the summation of transformed values may be input into content identification rules, while others may be possible.

By way of example, a system for determining when spectral flux content identification may be utilized. Spectral flux processing may be invoked when the mean of the summation of transformed values may be greater or equal to the standard deviation. Optionally, when the mean of summation of transformed values is less than the standard deviation, spectral flux processing is not be invoked. This technique represents one possible method, while others may be possible.

By way of example, spectral flux may be utilized to identify program and advertisement content. Optionally, content segments may be classified as advertisement when the summation of transformed values of the spectral flux is predominantly below the threshold range, such as mean, standard deviation or standard deviation subtracted from mean. Optionally, content may be classified as program segments when the summation of transformed values of the spectral flux is predominantly above the threshold range, such as mean, standard deviation or standard deviation subtracted from mean. This technique represents one possible method, while others may be possible.

Optionally, the following techniques may be utilized to derive magnitude-angle to complex (MAC) differences from a plurality of channels, which is also referred to herein as FBMA2. One optional method may generate decimated feature sequences from a plurality of audio channels, e.g., LCI-1 and Rt, although other audio channels may be used. Other techniques, including those described in U.S. Pat. No. 8,825,188, the content of which is incorporated herein by reference in its entirety, or any other equivalent may be used.)

Optionally, the LCI-1 and Rt signals may be matrix concatenated along the second dimension on a frame by frame basis and input into a two-channel, high band/low band filter. Optionally, the low-pass FIR filter coefficients may range from −1 to 1, while other values may be possible. For example, the low-pass FIR filter coefficients may be [0.0352 −0.0854 −0.1350 0.4599 0.8069 0.3327] and the high-pass FIR filter coefficients may be [−0.3327 0.8069 −0.4599 −0.1350 0.0854 0.0352], while other appropriate coefficients may be used. Optionally, the multi-channel high band may be input into the magnitude of the MAC and the multi-channel low band may be input into the angle of the MAC producing a multi-channel complex matrix as output. Optionally, the MAC may utilize the CORDIC approximation method, while other methods may be used. Optionally, the difference, along the second dimension, of the multi-channel complex matrix are input into an RMS calculation that produces a single value per frame. Optionally, the RMS output is mid-term processed and the mid-term window length and step sizes may range from 1 to 15,360 samples. For example, the mid-term may use a window size of 12 samples and a step size of 4 samples, while other sizes may be utilized. Optionally, the mid-term processed output is input into a signal normalization routine using a squared to normalization method, while others may be possible. Optionally, the normalized output may be input into a minimum selection routine producing one value per frame. Optionally, the minimum value may be windowed and input into a wavelet de-noise function utilizing wavelet packet decomposition Daubechies coefficient 2, while others functions and coefficients may be possible. Optionally, on a per frame the maximum wavelet de-noised value may be passed through a limiter with preset or variable upper and lower value limits, and then may be matrix concatenated with the original pre-limiter value which may be input into a calculation to determine the mean, while many others may be possible. Optionally, a threshold may be determined by employing a training dataset of known program and advertisement segments and a binary search algorithm may be utilized varying the threshold until the maximum success rate may be achieved. Optionally, methods may be utilized to identify content by calculating a dynamic threshold. In an optional first state, the standard deviation and/or mean may be derived from FBMA2 output over a time duration (e.g., the total time duration or other appropriate time duration, optionally using other). Optionally, a dynamic threshold range may be calculated by adding the standard deviation to the mean and/or subtracting the standard deviation from the mean, while other methods and calculations may be possible.

In other optional methods, the value from FBMA2, on a per-frame basis, may then be compared with a dynamic threshold, and FBMA2 values above the threshold may be classified as an advertisement, and FBMA2 values below the threshold may be classified as a program, while other or additional classifications may be used. A further optional refinement to the classification method that may remove outlier conditions invokes an adjudication timer when the signal crosses the calculated threshold. The adjudication timer may be an optional device or routine that, once invoked, begins counting time from zero (or other start time) and increasing until a target end condition is reached. For example, once a signal crosses the dynamic threshold the timer may delay content classification switching until the target end condition, such as 8 seconds, may be reached, while other delay times may be used.

Figure 14:
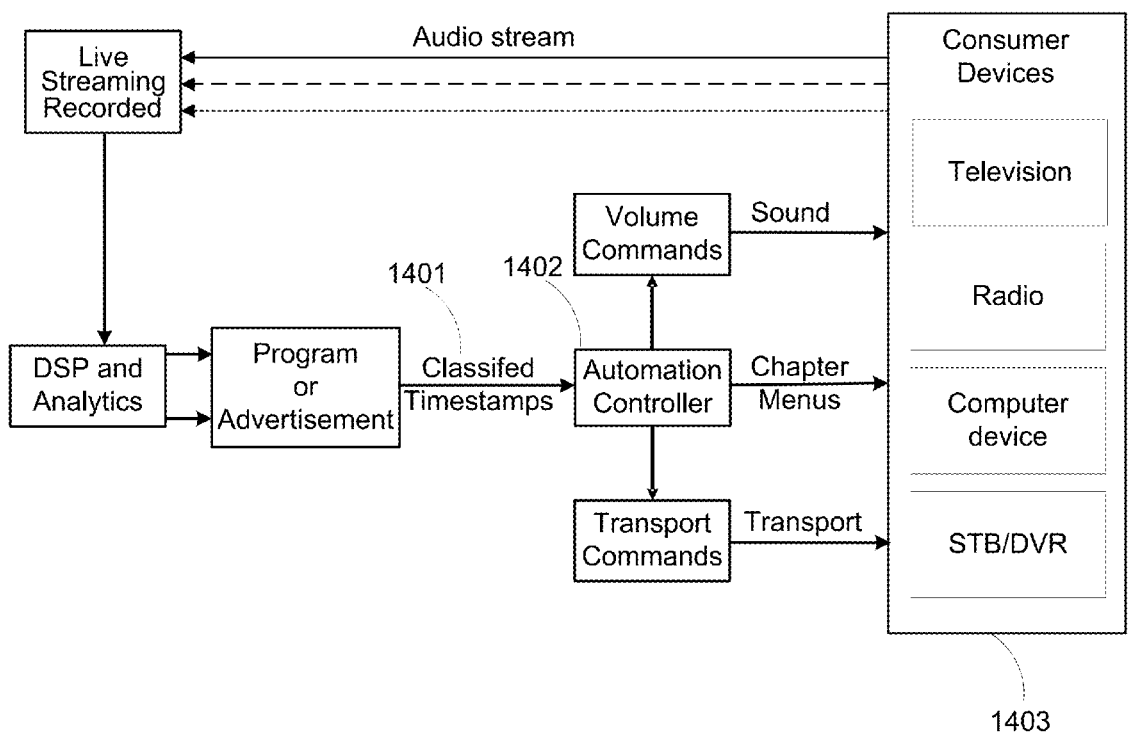
FIG. 14 is a block diagram of an example implementation.

By way of example and with reference to FIG. 14, significant events and corresponding time codes, content classification, and/or timestamps 1401 may be utilized to automate 1402, enhance and/or provide direct access within a device 1403. An example illustration of direct access may be to compare a DVR (digital video recorder) where one may fast forward through earlier scenes to get to later scenes (sequential) and a DVD where one may directly skip to the desired scene (direct access).

By way of example, significant events and timestamps, content classifications, and or automation instructions may be transmitted to multimedia devices (e.g., radio, DVR, set-top box (STB), TV, remote control, phone, tablet, laptop, desktop, video console, or other multimedia device), utilizing one or more optional formats (e.g., radio frequency (RF), infrared (IR), Bluetooth®, Ethernet, and/or other wired or wireless communication medium). In an optional implementation, significant events and corresponding time codes, content classifications, timestamps and or automation instructions may be received using many optional formats, for example; software abstraction layer, API or other interface method.

Figure 15:
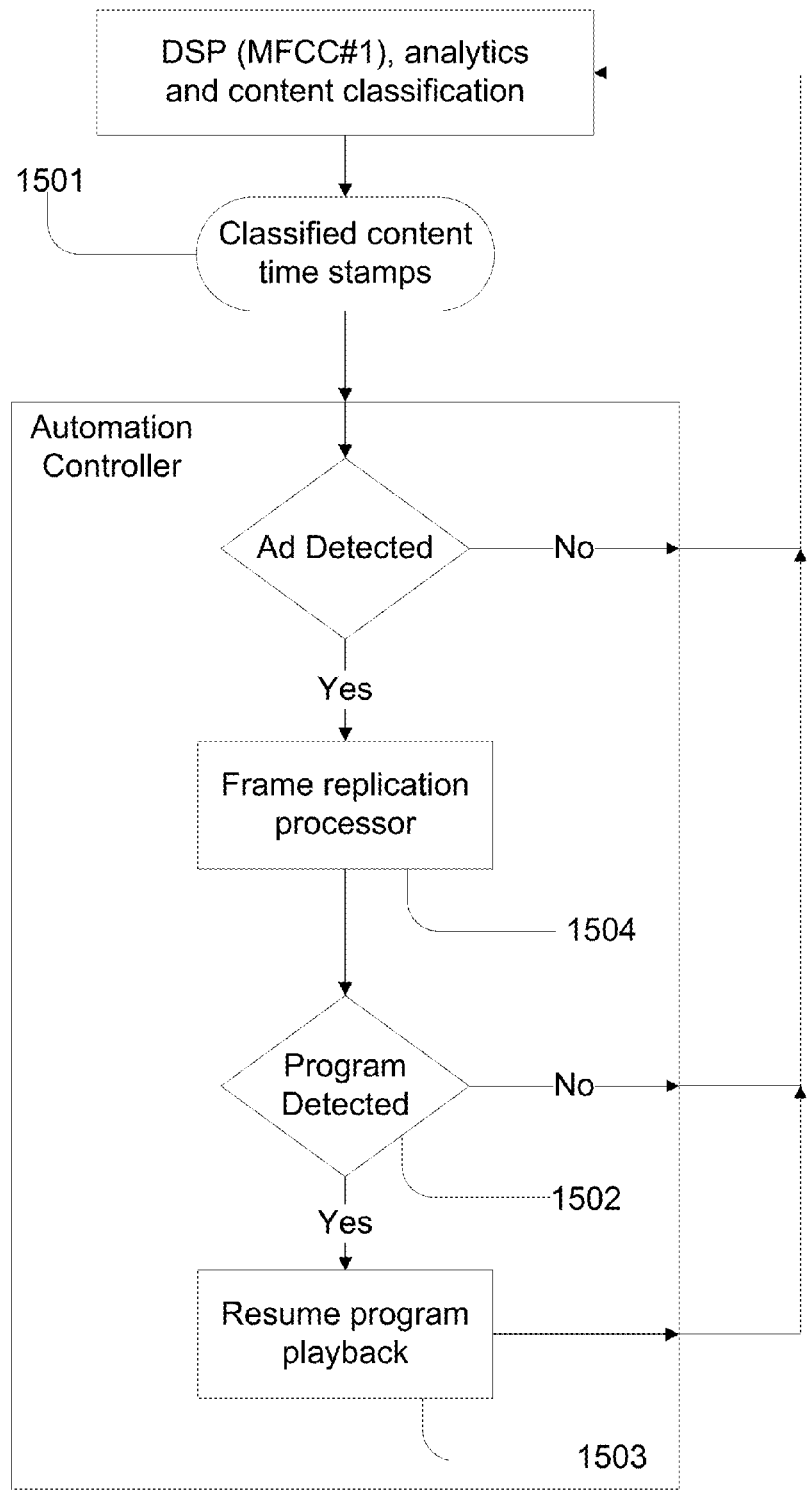
FIG. 15 is a block diagram illustrating an example of advertisement automation with auto detection of end of advertisement segment.

Transport control automation optionally provides viewers a sub-second viewing of the advertising every 'N' seconds, and optionally auto-terminates the transport fast-forward and automatically begins playing the next program segment. y way of example and with reference to FIG. 15, content classifications and timestamps 1501 may cause direct access transport or sequential transport to automatically stop fast forward 1502 or rewind 1502 at (or approximately at) advertisement or program segment content classification timestamp locations 1503 (e.g., optionally plus or minus a buffer period, such as 0.5 seconds, 1 second, 5 seconds, or within the range of 0.5 seconds-5 seconds), with other implementations possible. For example, a viewer may choose to fast-forward 1504 through advertisement content (via remote control) and resume playback 1503 at the next program segment. With sequential access transport technology, often the viewer would miss the intended time location.

By contrast, using the automation method disclosed herein, the program may resume playback 1503 such that the program content will not be skipped.

Optionally, content classifications and timestamps 1501 may be utilized during fast forward to provide unique methods for viewers to view and comprehend advertisements or other relevant content. Optionally, during advertisement segments, automation 1504 may be utilized to provide a fast-forward capability where viewers may be exposed to a single frame that may be replicated and displayed for a specified number of frames, optionally followed by jumping forward 'N' seconds, (e.g., 4 seconds), retrieving the next logical frame and then optionally repeating the process until the advertisement concluded 1502, 1503. By way of example, playback of a single frame may be replicated 10 times for every 10 frames of advertisement video, while other options may be utilized, such as playback of 1 or more unique frames for every N frames of video.

Optionally, content classifications and timestamps 1501 may be utilized to provide automation 1504 during fast-forward. Optionally if a viewer initiates fast-forward during an advertisement segment automation may begin playback 1503 at the beginning of the next program segment.

Optionally if a viewer initiates fast-forward during a program segment, automation may continue the fast-forward through the end of the current program segment and optionally through the next advertisement segment and may automatically resume playback at the beginning of the next program segment.

Optionally, content classifications and timestamps may be utilized to provide automation during rewind. Optionally, if a viewer initiates rewind during a program segment to optionally automatically begin playback when the beginning of the program segment may be encountered. For example, if a viewer presses rewind during a program, automation may detect when the beginning of program segment, or the end of the previous advertisement segment occurs and automatically begin playback at the beginning of the program segment. If a viewer initiates rewind during an advertisement segment automation may be utilized to stop the rewind at the beginning of an advertisement segment and optional automatically begin playback. For example, if a viewer presses rewind during an advertisement segment, automation may detect the beginning of advertisement segment and automatically begin playback at the beginning of the advertisement segment. Optionally, by way of example, the rewind may continue past the beginning of the advertisement segment through the previous program segment and automatically begin playback at the beginning of the previous program segment.

Optionally, content classifications and timestamps may be utilized to automatically start and stop fast forward or rewind for advertisement segment content classification timestamp locations, (e.g., a program segment). For example, enabled devices may deliver fast forward automation of advertisement content (without a remote control) and resume playback at the next program segment. Without automation transport technology, the viewer would frequently miss the intended time location. Optionally, in a further process, direct access transport automation, utilizing content classification timestamps may start and stop the fast-forward or rewind automation at the intended location and automatically resume playback.

Optionally, significant events and corresponding time codes, content classifications, time durations and/or timestamps may be utilized to automatically fast-forward by predetermined time duration intervals in advertisement content segments and/or program segments. For example a viewer may choose to fast-forward advertisement content by time duration intervals such as 15 seconds, 30 seconds, 60 seconds, or 120 seconds, with other time durations possible, for example 180 seconds.

By way of example, significant events and corresponding time codes may be utilized to provide a skip function for advertisement content (e.g., plus or minus a buffer period, such as 0.5 seconds, 1 second, 5 seconds, or within the range of 0.5 seconds-5 seconds). In a further optional process, significant events and corresponding time codes, content classifications and/or timestamps may be utilized to further separate advertisement segments into separate advertisement content timestamp locations. Optionally, a further method for collecting a plurality of data points relating to one or more interactions of said viewer advertisement segments and/or individual content timestamp locations within the advertisement segments may be utilized. Optionally, a process for identifying based at least in part on a plurality of data points of one or more of a second plurality of next sequential advertisement content in place of the current advertisement content. For example, a viewer may choose to skip (jump) from the current advertisement content to the next advertisement content.

Figure 16:
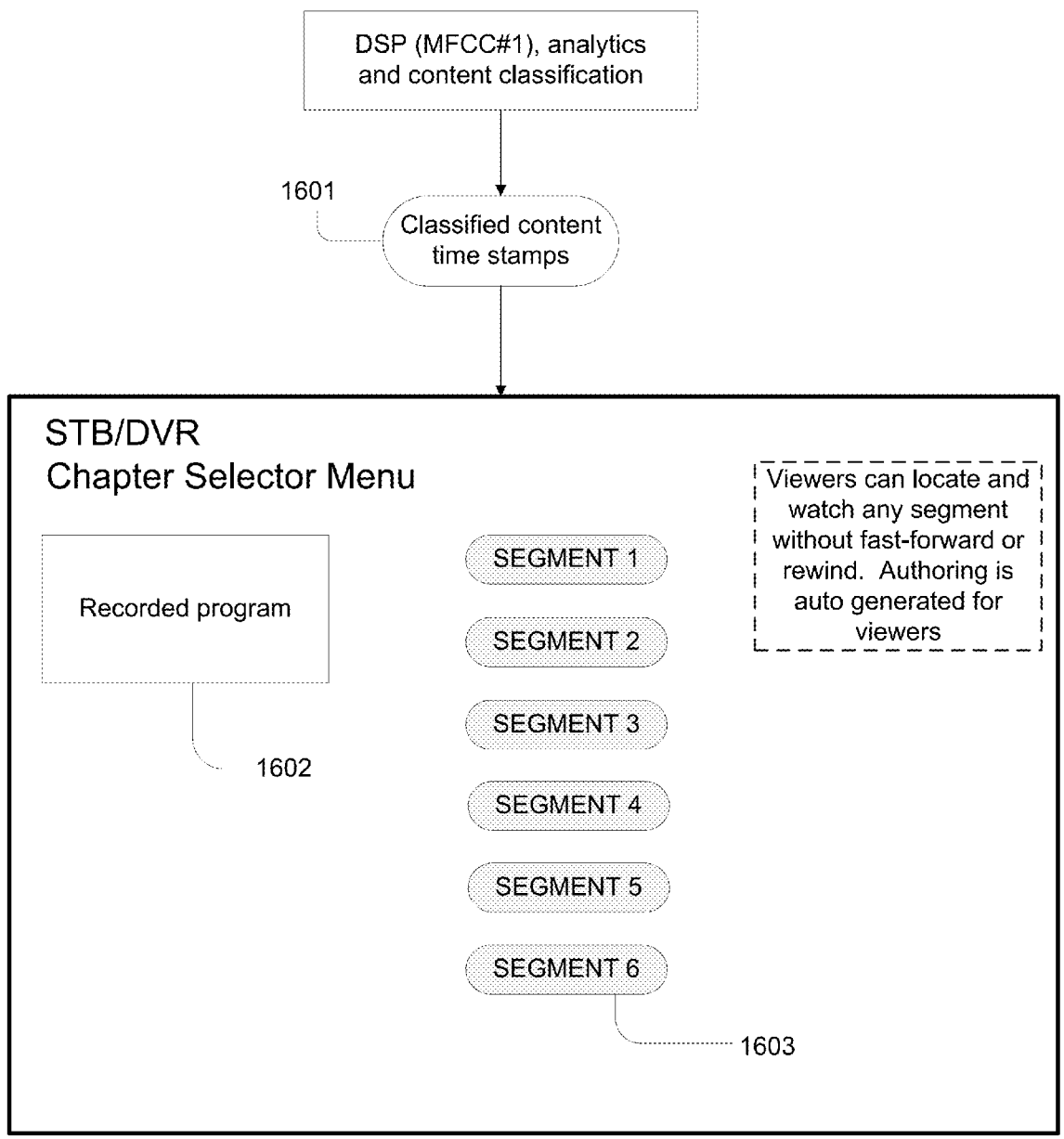
FIG. 16 is a block diagram and layout illustrating an example program chapter selector menu

By way of example and with reference to FIG. 16, example methods of identifying and displaying selectable logical or physical groupings of individual content (e.g., chapter menus) 1602, 1603, of recorded and/or live programs may be created using content classifications and/or timestamps 1601, significant events, and/or located using direct access. Optionally, significant event and corresponding time codes, content classifications and/or timestamps 1601 may be utilized for locating program segments 1602, 1603 within a television program or other media content. In an optional further process, enabled devices utilizing a selectable display of content may utilize automated transport to locate the selected program and/or advertisement segments. In another optional process, a content producer or other third party may produce selectable displays of content using methods other than content timestamp locations such as delivered from an external source, storage device, or other delivery service. For example, using a non-enhanced DVR and optionally a remote control, a viewer may decide to view a specific segment of content; however, to do so the user may need to search manually, often at 2×, 4×, or 8× speed. In addition, using conventional manual search methods, once the viewer stops the search, it is unlikely the device will stop at the precise program segment start point. Conversely, a device enabled with selectable displays of content, or chapter menus 1602, 1603, may provide a viewer a method to visually see a list of program chapters 1602, scroll to the desired chapter, select the chapter and the device may automatically locate and access the selected chapter and begin playback of the selected chapter.

Optionally, chapter menu segments may be organized to include advertisement content followed by program content or may be organized to include program content followed by advertisement content or may be organized in the order received. For example, if a viewer chooses program segment #2 from a chapter menu, the advertisement content, (e.g., an advertising segment) would play as it was originally broadcast and optionally followed by the program segment.

Optionally, chapter menus may be organized, utilizing significant event and corresponding time codes, content classifications and/or timestamps to contain a signal advertisement segment that may represent a group, or collection of advertisement segments. Optionally, significant event and corresponding time codes, content classifications and/or timestamps may be utilized to create advertisement and program segment chapter menus. Optionally, significant event and corresponding time codes, content classifications and/or timestamps may be utilized to collect content, (e.g., advertisement, network promos, movie trailers) in advertisement segments to create chapter menus. Optionally, significant event and corresponding time codes, content classifications and/or timestamps and video frames may be utilized for capturing thumbnails in chapter menus that may be used as a visual representation of the optional advertisements and/or program segments. Optionally, thumbnails may include, but are not limited to, images (e.g., JPEG, PNG, or other format) and/or video clips (e.g., MPEG2, MPEG4, or other format) in the graphical user interface (GUI) that may provide static or moving visual image(s) to a viewer.

By way of example, chapter menu selections, IP addresses of devices, transport control actions, automation instructions, automation actions, automation configuration setup options, automation preferences, volume changes, device audio setting changes, device configuration automation, significant event and corresponding time codes, content classifications, time codes, any and all transmission of any of the above within a device to another system, subsystem and/or component may be captured for tracking viewer or listener analytics in advertisement content (e.g., advertising, promotional content), and program content.

Optionally, user interactions with chapter menus, transport automation and/or volume control enhancements may be captured and may be utilized to improve advertising and content program viewership. Dynamic and customizable program and advertisement content may be selected and/or provided to viewers based on actual information obtained from that user's interaction decisions with a devices chapter menus, transport automation and volume control enhancements.

Optionally, data may be collected, such as but not limited to, usage patterns regarding program and advertisement content and channels accessed and/or viewed. Optionally, patterns of behavior may correlate to time of year, time of month, day of the week, part of the day, advertisement skip, advertisement fast-forward, and or rewind, etc., chapter menu selections, volume automation, channel swapping, replay, and/or other metrics.

Optionally, chapter menu selections, IP addresses, transport control actions, automation instructions, automation actions, automation configuration setup options, automation preferences, volume changes, device audio setting changes, device configuration automation, significant event and corresponding time codes, content classifications, and/or timestamps may be collected and analyzed. For example, recommend tailored advertisement content including those which it is inferred (according to the collected data and/or user input/preferences) the user would be most or more interested in receiving may be provided and/or suggested. Optionally, others may recommend adding and/or dropping specific channels or advertisement content from the user's subscription package or lineup. Optionally, if the data indicates that channels carrying particular content or advertisement content are often selected by the user, the system may not only recommend keeping those particular channels and/or advertisement content, but may also recommend channels which carry content similar to that carried on the identified channels. For example, if it is determined that a subscriber often spends time viewing a specific program on the Discovery® channel, the system may recommend adding the National Geographic® program channel to the subscriber's lineup. For example, if a subscriber generally views sports-related program channels only during basketball season and may otherwise be focused on movie-related program channels, the system may recommend sports channels be added to his program lineup during one part of the year and movie channels be added during the other portions of the year.

Figure 17:
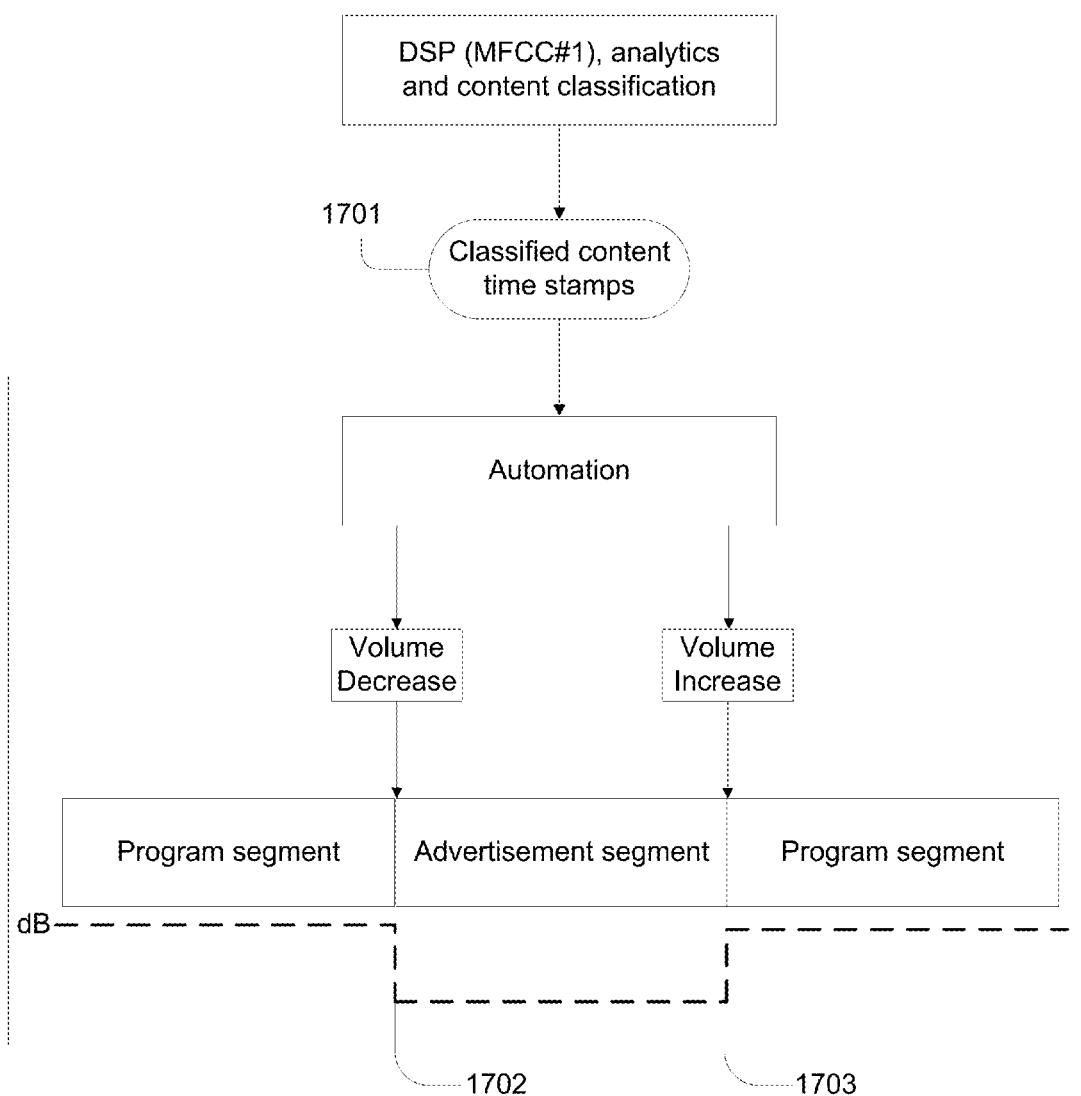
FIG. 17 is a block diagram and layout illustrating an example volume automation
Figure 18:
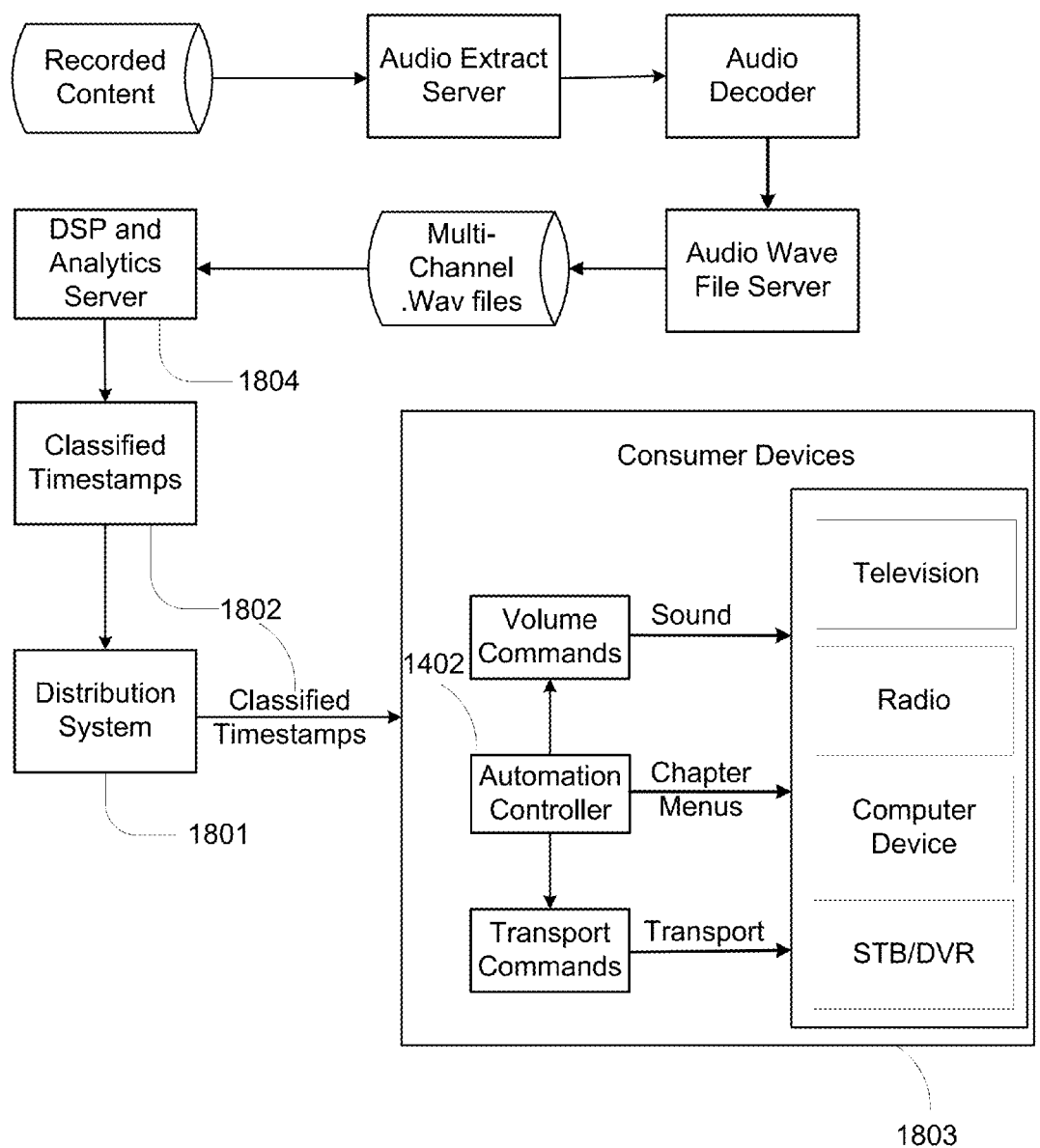
FIG. 18 is a block diagram of an example implementation within a content distributor system and communicating with consumer devices.

By way of example and with reference to FIG. 17, a method and system for automatically adjusting device volume 1702, 1703 as a function of content classification, significant event and corresponding time codes and/or timestamps 1701 in an audio processing device (e.g., A/V receiver, radio, STB, DTV, DVR, television, phone, tablet, laptop, desktop computer, game console, remote controller, and/or other devices). Optionally, the present apparatus may relate to the field of multimedia technology and automatic volume adjusting methods, automatic multimedia content volume adjusting systems, and remote controllers, while others may be possible.

By way of example, while viewing or listening to devices viewers may often increase, decrease, or mute a devices volume via a volume adjustment circuit. Ineffective loudness control may result in a degraded viewing experience, switching to other channels or providers and/or regulatory issues. Optionally, the device volume adjusting method may include regulating a volume adjusting control component on a device, or directly adjusting a volume control component utilizing a remote control device. Technologies have been developed, such as the dialogue normalization features in metadata that may match loudness levels in a plurality of channels. To increase effectiveness, broadcasters may set metadata levels when preparing content for broadcast, however, loudness issues may arise during content creation and/or at many other points in the broadcast chain that may reduce the effectiveness of such features.

Optionally, the apparatus may automatically change the volume 1702, 1703 (e.g., using a digital or analog volume control circuit) based on significant event and corresponding time codes, content classifications and/or time stamps 1701. Additionally, the apparatus may provide an optional audio volume control method that may provide for automating volume adjustments with greater accuracy than manually performed volume adjustments and potentially utilizing less processing within a decoder. Optionally, in a further process, a time constant circuit may serve to smooth volume transients when the sound may sharply increase during the program to advertisement transition.

By way of example, a system may relate to an automated gain control circuit in an audio processing device (e.g., A/V receiver, radio, STB, DTV, DVR, television, phone, tablet, laptop, desktop computer, game console, remote controller, and/or other devices), which may change the level, gain or dynamic range of audio dynamics processing system device as a function of significant event and corresponding time codes, content classification and/or significant event and corresponding time code locations (e.g., program and advertisement segment start and stop times). Optionally, the system may relate to a computer software program for performing such methods or controlling such apparatus. In another process, optional gain modifications may be applied to an audio signal at least partly in response to auditory event characteristics that may be associated with said auditory event boundaries. An optional automatic volume control device may adjust the volume By way of example, a system may utilize significant events and corresponding time codes, content classifications, and/or timestamp locations for automatically swapping or exchanging a presently selected channel for a plurality of nominated channels including recorded and/or live content for the time duration of the plurality of channel contents. A further process may continually monitor the contents utilizing significant events and corresponding time codes, content classifications, and/or timestamp locations and may determine when to swap channels, which channel to swap (change) to and the time duration to remain on each current channel. A further optional process may continually monitor the content utilizing significant event and corresponding time codes, content classifications, and/or timestamp locations and may determine when individual channels may have reached a concluding point and may be removed from the plurality of monitored channels.

By way of example, decoder metadata parameters may be automated and/or affect dynamic changes as a function of significant event and corresponding time codes, content classifications and/or timestamps. For example, consumer decoders may reproduce program and advertisement audio according to metadata parameters and may further be processed based upon settings such as speaker configuration, bass management and dynamic range while others may be possible, that may be set to match specific home theater equipment, audio/video receiver, stereophonic equipment, televisions, radios, speakers, and environmental conditions, while other configurations and settings may be possible.

Optionally, the present apparatus may automatically select whether or not to use dynamic range control (DRC) and if so, may further select which operating mode to use that may depend on content classification, significant event and corresponding time codes and/or timestamps (e.g., program, advertisement, ambient noise). For example, different home listening environments and content may present a wide range of requirements for dynamic range. Full-featured decoders today may require the viewer to manually select whether or not to use DRC and if so, may further require which operating mode to use.

Optional methods, systems, and products may be provided to enhance parental control capabilities in devices during presentation of multimedia content as a function of program and/or advertisement timestamps. For example, viewers may decide to view TVG rated content. However, advertisement segments may not bet rated and may not be blocked. In addition, network promos may contain ratings other than the current program content; therefore there is room for improvement with respect to parental control.

Significant events and corresponding time codes, content classifications, and/or timestamp locations may be utilized to detect advertisement segments. In a further optional process, advertisement significant events and corresponding time codes, content classifications, and/or timestamp locations may be utilized to enhance, control, and/or automate the remote control transport or device transport (e.g., functions, fast-forward, channel swap, skip, sound attenuation, volume mute etc.) for advertisement segments, with other segments possible (e.g., a program).

The example methods and processes described herein may utilize fewer or additional steps or states and the steps or states may be performed in a different order. Not all steps may need to be processed and not all states may need to be reached. The example methods and processes described herein may be embedded in, and/or fully or partially automated via, software code modules executed by one or more general purpose computers. The example code modules may be stored in any type of computer-readable medium or other computer storage device. Some or all of the methods may alternatively be embodied in whole or in part in specialized computer hardware. The example systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality may be implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like.

A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others.

All of the methods and processes described above may be embodied in, and fully automated via, software code modules executed by one or more general purpose computers. The code modules may be stored in any type of computer-readable medium or other computer storage device. Some or all of the methods may alternatively be embodied in specialized computer hardware. The results of the disclosed methods may be stored in any type of computer data repository, such as relational databases and flat file systems that use magnetic disk storage and/or solid state RAM.

While the phrase "click" may be used with respect to a user selecting a control or the like, other user inputs may be used, such as voice commands, text entry, gestures, etc.

Many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A method of processing audio signals to identify content, the method comprising:
   receiving digitized audio content;
   decoding the audio content using a decoder;
   segmenting frames of the decoded audio content by applying a windowing function to a given audio frame using a first window type having a time width approximately equal to a delay time of the decoder;
   calculating an estimate of a power spectrum of a given frame;
   applying a mel filter bank to the power spectrum of the given frame and providing resulting filter bank energies;
   applying a DCT matrix to the resulting filter bank energies to generate a DCT output;
   taking a log of the DCT output to generate a mel coefficient 1;
   dynamically calculating a first threshold for the content; and
   utilizing the mel coefficient 1 and the dynamically calculated first threshold to detect a near silence between content of different types and to identify the types of content separated by the near silence.

2. The method as defined in claim 1, wherein the digitized audio content is associated with synchronized video content.

3. The method as defined in claim 1, wherein dynamically calculating the first threshold for the content comprises:
   identifying a set of statistics utilizing a second window type, the second window type having a time width between about 1 and 4 magnitudes greater than the first window time width, the statistics comprising minimum values of mel coefficient is corresponding to content windowed using the second window type;
   determining a standard deviation for the minimum values of mel coefficient 1s;
   calculating the threshold based at least in part on the mid-term statistics and the standard deviation.

4. The method as defined in claim 1, wherein the window type step size is set to be less than a predetermined distance, in time from a frame boundary.

5. The method as defined in claim 1, wherein dynamically calculating the first threshold for the content comprises:
   subdividing a plurality of mel coefficient is into a plurality of segments using overlapping windows of a second type, wherein a given window of the second type is advanced by a second window type step with respect to an immediate preceding window of the second type, and wherein a given window of the second type overlaps an immediate preceding window of the second type, wherein:
   a step size of a window of the second type is determined based at least in part on a decimation of a window of the first type step size, and wherein
   a window size of a window of the second type is determined based on least in part by dividing the determined window of the second type step size by a first type window step percentage for a window of the first type;

identifying a set of statistics based on a minimum value of mel coefficient 1s corresponding to the content within each window of the second type, the statistics comprising a minimum value of mel coefficient 1s and mean value of mel coefficient 1s;

determining a standard deviation for the minimum values of mel coefficient 1s; and dynamically calculating the threshold based at least in part on the statistics and the standard deviation.

6. The method as defined in claim 1, wherein utilizing the mel coefficient 1 and the dynamically calculated first threshold to detect a near silence between content of different types and to identify types of content separated by the near silence comprises:

assigning respective timestamps to a plurality of near silences;

calculating a duration between a first timestamp and a second timestamp;

comparing the calculated duration to a second threshold;

at least partly in response to determining that the calculated duration is greater than the second threshold, identifying content between the first timestamp and the second timestamp as a first type of content;

at least partly in response to determining that the calculated duration is less than or equal to the second threshold, identifying content between the first timestamp and the second timestamp as a second type of content.

7. The method as defined in claim 1, wherein utilizing the mel coefficient 1 and the dynamically calculated first threshold to detect a near silence between content of different types and to identify types of content separated by the near silence comprises:

assigning respective timestamps to a plurality of near silences;

calculating a first duration between a first timestamp and a second timestamp;

comparing the calculated first duration to a second threshold;

at least partly in response to determining that the calculated first duration is greater than the second threshold, identifying content between the first timestamp and the second timestamp as a first type of content;

at least partly in response to determining that the calculated first duration is less than or equal to the second threshold, identifying content between the first timestamp and the second timestamp as a second type of content;

detecting that a user has issued a fast forward command during playback via a content player of the content of the first type between the first timestamp and the second timestamp;

at least partly in response to detecting the fast forward command, causing playback of the content from the time the fast forward command was detected through about the second timestamp to be skipped and causing content playback to begin at about the time of the second timestamp.

8. The method as defined in claim 1, wherein utilizing the mel coefficient 1 and the dynamically calculated first threshold to detect a near silence between content of different types and to identify types of content separated by the near silence comprises:

assigning respective timestamps to a plurality of near silences;

categorizing content between a given near silence timestamp and a next near silence timestamp based at least in part on a time duration between the given near silence timestamp and the next near silence timestamp;

detecting that a user has issued a fast forward command during playback via a content player of content categorized as being of a first type;

at least partly in response to detecting the fast forward command, causing playback of content of the first type to be skipped, then skipping playback of subsequent content of the second type, and resuming playback upon occurrence of content of the first type after the skipped content of the second type.

9. The method as defined in claim 1, the method further comprising:

assigning respective timestamps to a plurality of near silences;

calculating a first duration between a first timestamp and a second timestamp;

comparing the calculated first duration to a second threshold;

identifying content between the first timestamp and the second timestamp as a first type of content at least partly in response to the comparison;

receiving a fast forward command from a user while the content between the first timestamp and the second timestamp is being played via a content player;

accessing the identification of the content between the first timestamp and the second timestamp as the first type of content;

at least partly in response to the fast forward command and the accessed identification of the content between the first timestamp and the second timestamp as the first type of content, repeatedly causing a first frame of content between the first timestamp and the second timestamp to be displayed a first predetermined number of times;

after repeatedly causing the first frame of content to be displayed the first predetermined number of time, selecting a second frame between the first timestamp and the second timestamp, the second frame subsequent to the first frame, wherein a plurality of content frames between the first timestamp and the second timestamp are skipped and not displayed;

repeatedly causing the second frame to be displayed a second predetermined number of times.

10. The method as defined in claim 1, wherein utilizing the mel coefficient 1 and the dynamically calculated first threshold to detect a near silence between content of different types and to identify types of content separated by the near silence comprises:

assigning respective timestamps to a plurality of near silences;

calculating a first duration between a first timestamp and a second timestamp;

comparing the calculated first duration to a second threshold;

identifying content between the first timestamp and the second timestamp as a first type of content at least partly in response to determining that the calculated first duration is less than or equal to the second threshold;

calculating a second duration between the second timestamp and a third timestamp;

comparing the calculated first duration to a third threshold;
identifying content between the second timestamp and the third timestamp as a second type of content at least partly in response to determining that the calculated second duration is greater than the third threshold;
detecting that a user is playing back content via a content player between the first timestamp and the second timestamp and accessing the identification of the content between the first timestamp and the second timestamp as being content of the first type;
at least partly in response to the accessed identification of the content between the first timestamp and the second timestamp as being content of the first type, adjusting a volume circuit to reduce a playback volume;
detecting that a user is playing back content between the second timestamp and the third timestamp and accessing the identification of the content between the second timestamp and the third timestamp as being content of the second type;
at least partly in response to the accessed identification of the content between the second timestamp and the third timestamp as being content of the second type, adjusting the volume circuit to increase the playback volume.

11. The method as defined in claim 1, wherein utilizing the mel coefficient 1 and the dynamically calculated first threshold to detect a near silence between content of different types and to identify types of content separated by the near silence comprises:
assigning respective timestamps to a plurality of near silences;
categorizing content between a given near silence timestamp and a next near silence timestamp based at least in part on a time duration between the given near silence timestamp and the next near silence timestamp;
utilizing one or more of the near silence timestamps to provide automated fast forwarding, rewinding, and/or volume control.

12. The method as defined in claim 1, wherein utilizing the mel coefficient 1 and the dynamically calculated first threshold to detect a near silence between content of different types comprises:
generating a second dynamic threshold;
validating a given detected near silence based at least in part on a determining that the given detected near silence is:
a predetermined percentage of decibels below the first dynamic threshold;
at least a first predetermined number of decibels below the first dynamic threshold; and
a mean decibel value of all detected near silences within a segment is at least a second predetermined number of decibels below the first dynamic threshold;
at least partly in response to validating the given detected near silence, identifying another near silence as a near silence based at least in part on a determination that the another near silence is less than or equal to the second dynamic threshold.

13. The method as defined in claim 1, the method further comprising:
monitoring user interactions with chapter menus, transport automation and/or volume control enhancements while one or more items are being played via a content player; and
based at least in part on the monitored user interactions, enabling program and/or advertising content to be selected and provided to the user via the content player.

14. A content identification system, comprising:
an input circuit configured to receive bitstream audio channel content;
an audio decoder circuit coupled to the input circuit and configured to decode the bitstream audio channel content;
an analysis engine configured to:
segment frames of the decoded audio content by applying a windowing function to a given audio frame using a first window type having a time width approximately equal to a delay time of the decoder;
calculate an estimate of a power spectrum of a given frame;
apply a mel filter bank to the power spectrum of the given frame and providing resulting filter bank energies;
apply a DCT matrix to the resulting filter bank energies to generate a DCT output;
take a log of the DCT output to generate a mel coefficient 1;
dynamically calculate a first threshold for the content; and
utilize the mel coefficient 1 and the dynamically calculated first threshold to detect a near silence between content of different types and to identify the types of content separated by the near silence.

15. The system as defined in claim 14, wherein the dynamic calculation of the first threshold for the content comprises:
an identification of a set of statistics utilizing a second window type, the second window type having a time width between 1 and 4 magnitudes greater than the first window time width, the statistics comprising minimum values of mel coefficient is corresponding to content windowed using the second window type;
a standard deviation determination for the minimum values of mel coefficient 1s;
a calculation of the threshold based at least in part on the mid-term statistics and the standard deviation.

16. The system as defined in claim 14, wherein the first window type step size is set to be less than a predetermined distance, in time, from a frame boundary.

17. The system as defined in claim 14, wherein the dynamic calculation of the first threshold for the content comprises:
a division of a plurality of mel coefficient is into a plurality of segments using overlapping windows of a second type, wherein a given window of the second type is advanced by a second window type step with respect to an immediate preceding window of the second type, and wherein a given window of the second type overlaps an immediate preceding window of the second type, wherein:
a step size of a window of the second type is determined based at least in part on a decimation of a window of the first type step size, and wherein
a window size of a window of the second type is determined based on least in part by dividing the determined window of the second type step size by a first window type step percentage;
an identification of a set of statistics based on a minimum value of mel coefficient 1s corresponding to the content within each window of the second type, the statistics comprising a minimum value of mel coefficient 1s and mean value of mel coefficient 1s;
a determination of a standard deviation for the minimum values of mel coefficient 1s; and
a calculation of the threshold based at least in part on the statistics and the standard deviation.

18. The system as defined in claim 14, wherein utilization of the mel coefficient 1 and the dynamically calculated first threshold to detect a near silence between content of different types and to identify types of content separated by the near silence comprises:
an association of respective timestamps to a plurality of near silences;
a determination of a duration between a first timestamp and a second timestamp;
a comparison of the duration between the first timestamp and the second timestamp to a second threshold;
at least partly in response to a determination that the calculated duration is greater than the second threshold, content between the first timestamp and the second timestamp is identified as a first type of content;
at least partly in response to a determination that the calculated duration is less than or equal to the second threshold, content between the first timestamp and the second timestamp is identified as a second type of content.

19. The system as defined in claim 14, wherein utilization of the mel coefficient 1 and the dynamically calculated first threshold to detect a near silence between content of different types and to identify types of content separated by the near silence comprises:
an association of respective timestamps to a plurality of near silences;
a determination of a duration between a first timestamp and a second timestamp;
a comparison of the duration between the first timestamp and the second timestamp to a second threshold;
at least partly in response to a determination that the calculated duration is greater than the second threshold, content between the first timestamp and the second timestamp is identified as a first type of content;
at least partly in response to a determination that the calculated duration is less than or equal to the second threshold, content between the first timestamp and the second timestamp is identified as a second type of content;
a determination that a user has issued a fast forward command during playback via a content player of the content of the first type between the first timestamp and the second timestamp;
at least partly in response to the determination that has user has issued the fast forward command, playback of the content from the time the fast forward command was detected through about the second timestamp is skipped and content playback restarts at about the time of the second timestamp.

20. The system as defined in claim 14, wherein utilization of the mel coefficient 1 and the dynamically calculated first threshold to detect a near silence between content of different types and to identify types of content separated by the near silence comprises:
an association of respective timestamps to a plurality of near silences;
categorizing content between a given near silence timestamp and a next near silence timestamp based at least in part on a time duration between the given near silence timestamp and the next near silence timestamp;
at least partly in response to a determination that a fast forward command was issued via a content player during playback of content categorized as being of a first type, playback of content of the first type is skipped, playback of subsequent content of the second type is skipped, and playback is resumed upon occurrence of content of the first type after the skipped content of the second type.

21. The system as defined in claim 14, wherein the system is configured to at least:
assign respective timestamps to a plurality of near silences;
calculate a first duration between a first timestamp and a second timestamp;
compare the calculated first duration to a second threshold;
identify content between the first timestamp and the second timestamp as a first type of content at least partly in response to the comparison;
receive a fast forward command from a user while the content between the first timestamp and the second timestamp is being played via a content player;
access the identification of the content between the first timestamp and the second timestamp as the first type of content;
at least partly in response to the fast forward command and the accessed identification of the content between the first timestamp and the second timestamp as the first type of content, repeatedly cause a first frame of content between the first timestamp and the second timestamp to be displayed a first predetermined number of times;
after the first frame of content is repeatedly displayed the first predetermined number of time, select a second frame between the first timestamp and the second timestamp, the second frame subsequent to the first frame, wherein a plurality of content frames between the first timestamp and the second timestamp are skipped and not displayed;
repeatedly cause the second frame to be displayed a second predetermined number of times.

22. The system as defined in claim 14, wherein utilization of the mel coefficient 1 and the dynamically calculated first threshold to detect a near silence between content of different types and to identify types of content separated by the near silence comprises:
an association of respective timestamps to a plurality of near silences;
a determination of a duration between a first timestamp and a second timestamp;
a comparison of the calculated first duration to a second threshold;
an identification of content between the first timestamp and the second timestamp as a first type of content at least partly in response to determining that the calculated first duration is less than or equal to the second threshold;
a determination of a second duration between the second timestamp and a third timestamp;
a comparison of the second duration to a third threshold;
an identification of content between the second timestamp and the third timestamp as a second type of content at least partly in response to determining that the calculated second duration is greater than the third threshold;
a determination that a user is playing back content via a content player between the first timestamp and the second timestamp and accessing the identification of the content between the first timestamp and the second timestamp as being content of the first type;

at least partly in response to the accessed identification of the content between the first timestamp and the second timestamp as being content of the first type, adjust a volume circuit to reduce a playback volume;

detect that a user is playing back content between the second timestamp and the third timestamp and accessing the identification of the content between the second timestamp and the third timestamp as being content of the second type;

at least partly in response to the accessed identification of the content between the second timestamp and the third timestamp as being content of the second type, adjust the volume circuit to increase the playback volume.

23. The system as defined in claim 14, wherein utilization of the mel coefficient 1 and the dynamically calculated first threshold to detect a near silence between content of different types and to identify types of content separated by the near silence comprises:

an association of respective timestamps to a plurality of near silences;

a categorization of content between a given near silence timestamp and a next near silence timestamp based at least in part on a time duration between the given near silence timestamp and the next near silence timestamp;

using one or more of the near silence timestamps to provide automated fast forwarding, rewinding, and/or volume control.

24. The system as defined in claim 14, wherein utilization of the mel coefficient 1 and the dynamically calculated first threshold to detect a near silence between content of different types and to identify types of content separated by the near silence comprises:

generation of a second dynamic threshold;

validation of a given detected near silence based at least in part on a determination that the given detected near silence is:

a predetermined percentage of decibels below the first dynamic threshold;

at least a first predetermined number of decibels below the first dynamic threshold; and a mean decibel value of all detected near silences within a segment is at least a second predetermined number of decibels below the first dynamic threshold;

at least partly in response to validating the given detected near silence, identify another near silence as a near silence based at least in part on a determination that the another near silence is less than or equal to the second dynamic threshold.

25. A non-transitory computer-readable storage medium storing computer-executable instructions that when executed by a processor perform operations comprising:

receiving digitized audio content;

decoding the audio content using a decoder;

segmenting frames of the decoded audio content by applying a windowing function to a given audio frame using a first window type having a first window time width;

calculating an estimate of a power spectrum of a given frame;

applying a mel filter bank to the power spectrum of the given frame and providing resulting filter bank energies;

applying a DCT matrix to the resulting filter bank energies to generate a DCT output;

taking a log of the DCT output to generate a mel coefficient 1;

dynamically calculating a first threshold for the content; and utilizing the mel coefficient 1 and the dynamically calculated first threshold to detect a near silence between content of different types and to identify the types of content separated by the near silence.

26. The non-transitory computer-readable storage medium as defined in claim 25, operations comprising:

assigning respective timestamps to a plurality of near silences;

calculating a duration between a first timestamp and a second timestamp;

comparing the calculated duration to a second threshold;

at least partly in response to determining that the calculated duration is greater than the second threshold, identifying content between the first timestamp and the second timestamp as a first type of content;

at least partly in response to determining that the calculated duration is less than or equal to the second threshold, identifying content between the first timestamp and the second timestamp as a second type of content.

27. The non-transitory computer-readable storage medium as defined in claim 25, operations comprising:

assigning respective timestamps to a plurality of near silences;

calculating a first duration between a first timestamp and a second timestamp;

comparing the calculated first duration to a second threshold;

at least partly in response to determining that the calculated first duration is greater than the second threshold, identifying content between the first timestamp and the second timestamp as a first type of content;

at least partly in response to determining that the calculated first duration is less than or equal to the second threshold, identifying content between the first timestamp and the second timestamp as a second type of content;

detecting that a user has issued a fast forward command during playback via a content player of the content of the first type between the first timestamp and the second timestamp;

at least partly in response to detecting the fast forward command, causing playback of the content from the time the fast forward command was detected through about the second timestamp to be skipped and causing content playback to begin at about the time of the second timestamp.

28. The non-transitory computer-readable storage medium as defined in claim 25, operations comprising:

assigning respective timestamps to a plurality of near silences;

calculating a first duration between a first timestamp and a second timestamp;

comparing the calculated first duration to a second threshold;

identifying content between the first timestamp and the second timestamp as a first type of content at least partly in response to the comparison;

receiving a fast forward command from a user while the content between the first timestamp and the second timestamp is being played via a content player;

accessing the identification of the content between the first timestamp and the second timestamp as the first type of content;

at least partly in response to the fast forward command and the accessed identification of the content between the first timestamp and the second timestamp as the first type of content, repeatedly causing a first frame of content between the first timestamp and the second timestamp to be displayed a first predetermined number of times;

after repeatedly causing the first frame of content to be displayed the first predetermined number of time, selecting a second frame between the first timestamp and the second timestamp, the second frame subsequent to the first frame, wherein a plurality of content frames between the first timestamp and the second timestamp are skipped and not displayed;

repeatedly causing the second frame to be displayed a second predetermined number of times.

29. The non-transitory computer-readable storage medium as defined in claim 25, operations comprising:

assigning respective timestamps to a plurality of near silences;

calculating a first duration between a first timestamp and a second timestamp;

comparing the calculated first duration to a second threshold;

identifying content between the first timestamp and the second timestamp as a first type of content at least partly in response to determining that the calculated first duration is less than or equal to the second threshold;

calculating a second duration between the second timestamp and a third timestamp;

comparing the calculated first duration to a third threshold;

identifying content between the second timestamp and the third timestamp as a second type of content at least partly in response to determining that the calculated second duration is greater than the third threshold;

detecting that a user is playing back content via a content player between the first timestamp and the second timestamp and accessing the identification of the content between the first timestamp and the second timestamp as being content of the first type;

at least partly in response to the accessed identification of the content between the first timestamp and the second timestamp as being content of the first type, adjusting a volume circuit to reduce a playback volume;

detecting that a user is playing back content between the second timestamp and the third timestamp and accessing the identification of the content between the second timestamp and the third timestamp as being content of the second type;

at least partly in response to the accessed identification of the content between the second timestamp and the third timestamp as being content of the second type, adjusting the volume circuit to increase the playback volume.

* * * * *

UNITED STATES PATENT AND TRADEMARK OFFICE
CERTIFICATE OF CORRECTION

PATENT NO. : 9,653,094 B2
APPLICATION NO. : 15/135369
DATED : May 16, 2017
INVENTOR(S) : Troy Christopher Stone et al.

It is certified that error appears in the above-identified patent and that said Letters Patent is hereby corrected as shown below:

In the Drawings

Sheet 14 of 18 (Fig. 14) at Line 10 (approx.), Change "Classifed" to --Classified--.

In the Specification

In Column 4 at Line 6, Change "menu" to --menu.--.

In Column 4 at Line 8, Change "automation" to --automation.--.

In Column 7 at Line 11 (approx.), Change "3 db))-3 dB)" to --3 dB))-3 dB)--.

In Column 13 at Line 22, Change "classification" to --classification.--.

In Column 20 at Line 39, Change "and or" to --and/or--.

In Column 20 at Line 47, Change "and or" to --and/or--.

In Column 20 at Line 55, Change "y" to --By--.

In Column 23 at Line 43, Change "and or" to --and/or--.

In Column 24 at Line 64, Change "volume" to --volume.--.

In the Claims

In Column 28 at Line 44, In Claim 3, change "is" to --1s--.

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,653,094 B2

In Column 28 at Line 55, In Claim 5, change "is" to --1s--.

In Column 32 at Line 38, In Claim 15, change "is" to --1s--.

In Column 32 at Line 50, In Claim 17, change "is" to --1s--.

In Column 33, at Line 51, In Claim 19, change "has" to --the--.